(12) United States Patent
Iida

(10) Patent No.: US 6,822,690 B2
(45) Date of Patent: Nov. 23, 2004

(54) IMAGE PROCESSING APPARATUS, IMAGE PICKUP APPARATUS, AND IMAGE PROCESSING METHOD CAPABLE OF ELIMINATING EFFECT OF OUTSIDE LIGHT

(75) Inventor: Kentaro Iida, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 799 days.

(21) Appl. No.: 09/811,513

(22) Filed: Mar. 20, 2001

(65) Prior Publication Data

US 2001/0026325 A1 Oct. 4, 2001

(30) Foreign Application Priority Data

Mar. 23, 2000 (JP) ...................................... 2000-081928

(51) Int. Cl.[7] .............................................. H04N 5/238
(52) U.S. Cl. ........................ 348/364; 358/362; 358/461
(58) Field of Search ........................... 348/207.99, 370, 348/371, 362, 364, 366, 222.1, 224.1, 234, 239; 382/274, 275, 321, 312, 112; 358/3.26, 475, 461

(56) References Cited

U.S. PATENT DOCUMENTS 5,929,908 A * 7/1999 Takahashi et al. .......... 348/364
5,969,761 A * 10/1999 Takahashi et al. .......... 348/362
6,204,881 B1 * 3/2001 Ikeda et al. ................. 348/362
6,697,536 B1 * 2/2004 Yamada ...................... 382/275
2003/0030743 A1 * 2/2003 Takahashi et al. .......... 348/362
2003/0194111 A1 * 10/2003 Kano et al. ................. 382/112

FOREIGN PATENT DOCUMENTS

| JP | 6-203205 | 7/1994 |
|---|---|---|
| JP | 8-189818 | 7/1996 |
| JP | 2627098 | 4/1997 |

\* cited by examiner

Primary Examiner—Tuan Ho
(74) Attorney, Agent, or Firm—McDermott Will & Emery LLP

(57) ABSTRACT

A pixel value is adjusted to satisfy an exposure condition using a ratio (EV ratio) of exposure amounts of images taken without illumination light and with illumination light. When the pixel value of one of two images is modified, a subtraction process is performed on the pixel values of these two images. By finding a difference between two images that satisfy the exposure condition for pickup, the effect of a shadow or the like due to an interior lamp can be eliminated. Finally, the subtraction result is adjusted. As a result, an image processing apparatus, image pickup apparatus, and image processing method can be provided capable of eliminating the effect of a shadow or the like due to an outside light caused to the taken image.

16 Claims, 19 Drawing Sheets

A

B

F I G. 5
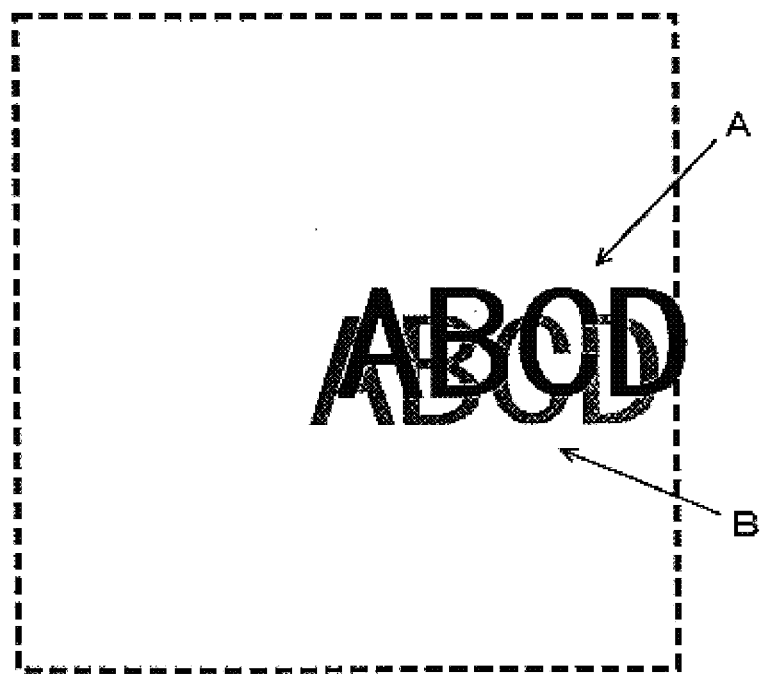

F I G. 6
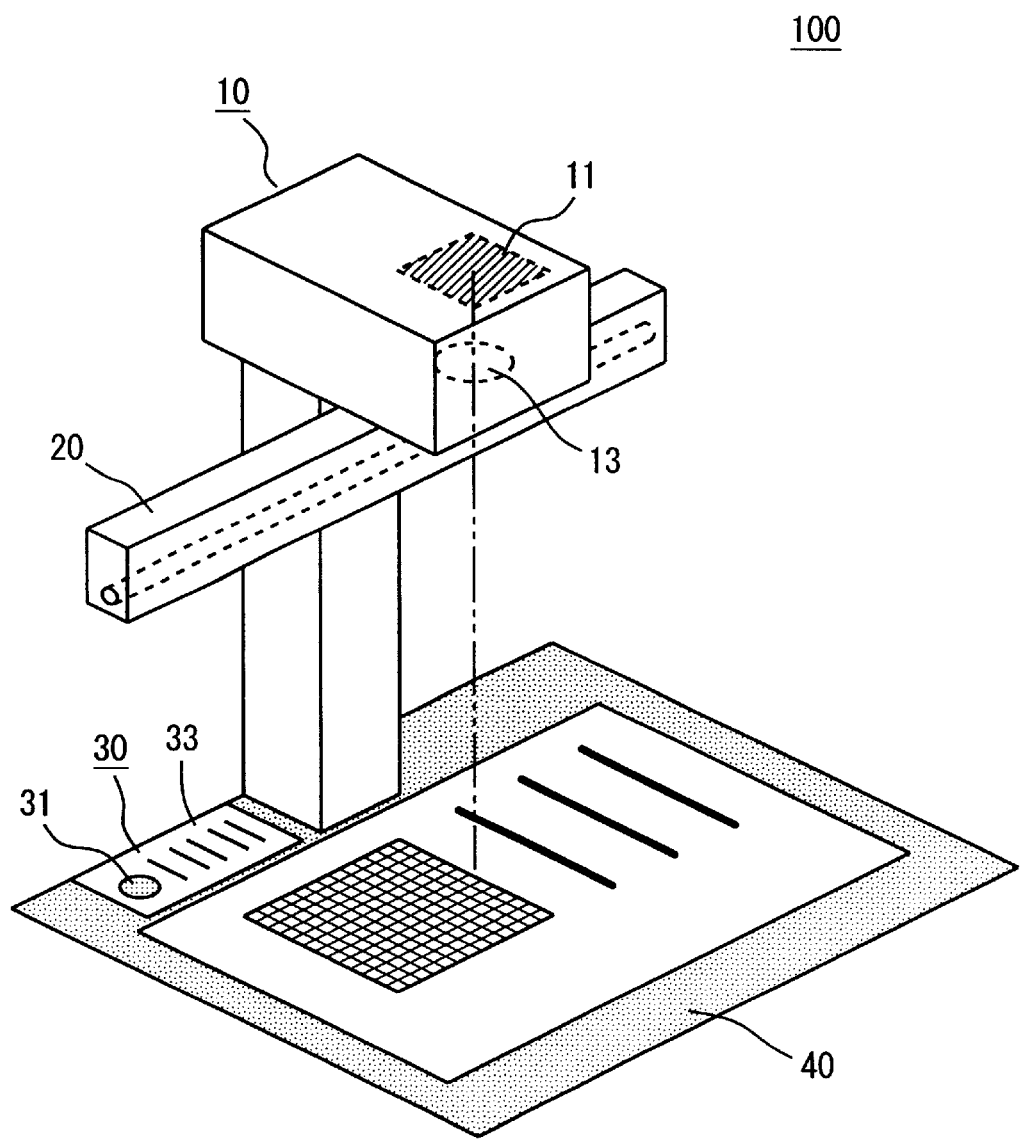

F I G. 1 2
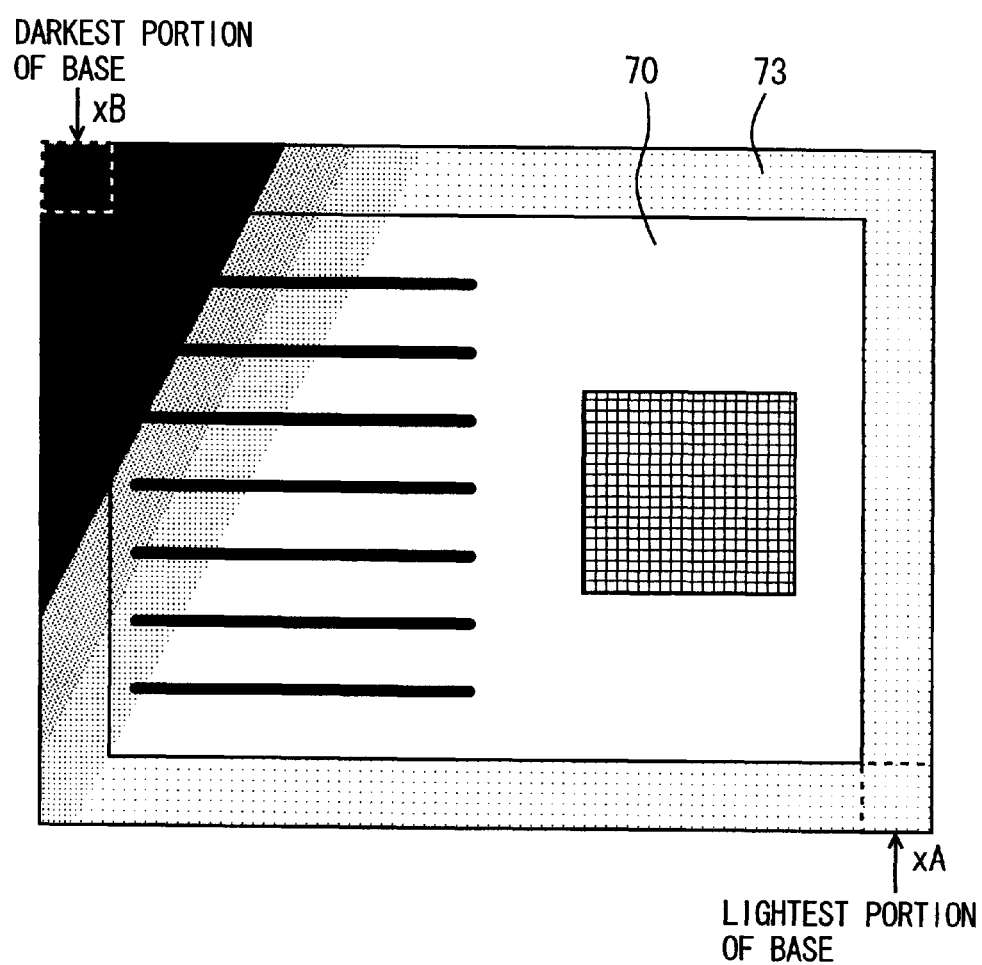

FIG. 19
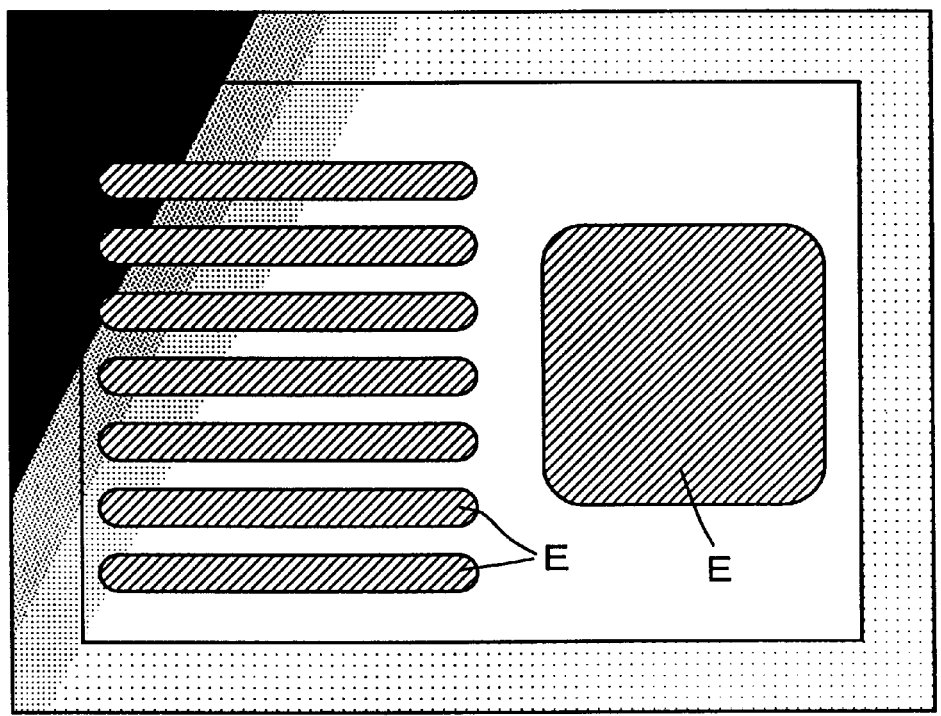
 EDGE REGION (WITH MARGIN)

IMAGE PROCESSING APPARATUS, IMAGE PICKUP APPARATUS, AND IMAGE PROCESSING METHOD CAPABLE OF ELIMINATING EFFECT OF OUTSIDE LIGHT

This application is based on Application Ser. No. 2000-81928 filed in Japan, the content of which is hereby incorporated by reference.

BACKGROUND OF THE INVENTION

1. Field of the Invention

The present invention relates to image processing apparatuses, image pickup apparatuses and image processing methods and, more particularly to an image processing apparatus, image pickup apparatus, and image processing method capable of eliminating an effect of outside light such as light from an interior lamp.

2. Description of the Related Art

Conventionally, image pickup apparatuses such a scanner has been known in which light is directed to a manuscript placed on a base and an image of the manuscript is taken by reading a reflection of the directed light. Such an image pickup apparatus suffers from a problem that the manuscript is illuminated with a light other than that of an illumination lamp in the apparatus, e.g., interior lamp. Thus, the image of the manuscript is affected by outside light such as light from the interior lamp. If such outside light is uneven and a shadow is projected because of an obstacle or the like, in particular, a somewhat strange image is taken which deviates from a desired image.

FIGS. 22A and 22B are diagrams shown in conjunction with projection of shadows onto the manuscript due to an interior lamp. FIG. 22A relates to the case where an image of a manuscript 70 placed on a base is read by an optical head 1 including, for example, a CCD (Charge Coupled Device), when an illumination lamp 2 is off. FIG. 22B relates to the case where the image of manuscript 70 is read when illumination lamp 2 is on. Note that an interior lamp 3 is on in either case.

Referring to FIG. 22A, when illumination lamp 2 is off, manuscript 70 is illuminated only with light from interior lamp 3. Since the light from interior lamp 3 is shielded by obstacle 4, a shadow is projected to manuscript 70. Thus, there is an illuminance difference between a shadow portion and a portion free from shadow over manuscript 70. Accordingly, the image read by optical head 1 is subjected to the effect of shadow because of the illuminance difference over the manuscript. Note that, for the shadow portion, an illumination light amount would not be 0 because of scattered light from outside.

Referring to FIG. 22B, when illumination lamp 2 is on, manuscript 70 placed on the base is illuminated with uniform light from illumination lamp 2 in addition to light from interior lamp 3. Accordingly, although manuscript 70 receives a greater amount of light, there still exists an illuminance difference over the manuscript between the shadow portion caused by interior lamp 3 and the portion free from shadow as in the case of FIG. 22A.

FIG. 23 is a graph showing illuminances of manuscript 70 when illumination lamp 2 in the apparatus is on and off. A solid line ① shows an illuminance over manuscript 70 in the case of FIG. 22A, that is, in the case where only interior lamp is directed to the manuscript when illumination lamp 2 is off. The shadow region on the left side of the manuscript has lower illuminance than the region free from shadow on the right side. Thus, there is an illuminance difference between the shadow portion and the portion free from shadow.

A solid line ② shows an illuminance over manuscript 70 in the case of FIG. 22B, that is, in the case where the interior lamp and the light from the illumination lamp are both directed to the manuscript when illumination lamp 2 is on. As compared with ①, the illuminance over the manuscript is higher over the entire region by a given amount of light from the illumination lamp. Thus, as in the case where the illumination lamp is off, there still exists an illuminance difference between the shadow region and the region free from shadow.

Accordingly, if the image of the manuscript is read when the illumination lamp is on, i.e., under a general image taking condition, the taken image is affected by the illuminance difference between the shadow region and the region free from shadow as indicated by ②. The illuminance difference causes brightness difference over the manuscript.

To eliminate the effect of the shadow caused by the interior lamp or the like, the image when the illumination lamp is off (the image in the case of only interior lamp) i.e., the image that is affected by a shadow or the like may be subtracted from the image when the illumination lamp in the apparatus is on. Namely, the image of the manuscript in the case of FIG. 22A is subtracted from that in the case of FIG. 22B.

SUMMARY OF THE INVENTION

An object of the present invention is to provide an image processing apparatus, image pickup apparatus, and image processing method capable of eliminating the effect of outside light caused to a taken image.

Another object of the present invention is to provide an image processing apparatus, image pickup apparatus, and image processing method capable of appropriately correcting any displacement caused to the taken image to eliminate the effect of outside light.

The above objects of the present invention is achieved by providing the image processing apparatus with the following elements. More specifically, according to one aspect of the present invention, an image processing apparatus includes: a first receiving portion receiving a first image of an object taken under a prescribed illuminating condition; a second receiving portion receiving a second image of the object taken under an illuminating condition different from the prescribed illuminating condition; and an eliminating portion eliminating an effect of outside light using the received first and second images. The eliminating portion includes: an adjusting portion adjusting at least one of the first and second images to equalize brightness differences of the first and second images; and a calculating portion calculating a difference between the first and second images that have been adjusted by the adjusting portion to have the same brightness difference.

According to the present invention, at least one of the first and second images taken under different illuminating conditions is adjusted to equalize the brightness differences of the first and second images. After the brightness differences of the images are equalized, a difference between these two images is calculated. Thus, purely the effect of outside light can be eliminated using the first and second images that have been affected by the same outside light.

Accordingly, an image processing apparatus capable of eliminating the effect of outside light caused to the taken image can be provided.

Preferably, the brightness difference adjusted by the adjusting portion is caused by a difference between amounts respectively for said first and second receiving portions when the first and second images are taken.

As such, the brightness difference caused by a difference in exposure amount when the first and second images are taken is eliminated. Thus, even if the images are subjected to different exposure lamps by automatic exposure, for example, such brightness difference is properly adjusted to eliminate the effect of a shadow or the like caused by the outside light.

Preferably, the image processing apparatus is characterized in that it further includes: a first exposure amount receiving portion receiving an exposure amount when the first image is taken; and a second exposure amount receiving portion receiving an exposure amount when the second image is taken. The adjusting portion performs adjustment to equalize the brightness differences of the images based on the exposure amounts respectively received by the first and second exposure amount receiving portions.

Thus, the exposure amounts when the first and second images are taken are received, based on which the images are adjusted. Accordingly, the brightness differences of the first and second images can be precisely and readily equalized.

Preferably, the image processing apparatus is characterized in that it further includes: a first brightness difference receiving portion receiving a brightness difference between a maximum brightness portion having the highest brightness and a minimum brightness portion having the lowest brightness of the first image; and a second brightness difference receiving portion receiving a brightness difference between a maximum brightness portion having the highest brightness and a minimum brightness portion having the lowest brightness of the second mage. The adjusting portion equalizes the brightness differences of the images based on the brightness differences respectively received by the first and second brightness difference receiving portions.

Thus, the brightness differences of the first and second images can be equalized based on the brightness differences of the maximum and minimum brightness portions of the first and second images. Thus, even if the exposure amount during image pickup is unknown, the brightness difference over each image can be eliminated based on the taken image.

More preferably, in the image processing apparatus, the maximum and minimum brightness portions, respectively having the maximum and minimum brightnesses, of the first and second image data refer to regions of the first and second images excluding the regions of object.

Thus, the brightness difference between the maximum and minimum brightness portions can be obtained from the image region excluding the region of the taken image, such as the regions of a base or reflector in each image. Accordingly, a desired brightness difference can be easily obtained.

Preferably, in the image processing apparatus, the maximum and minimum brightness portions, respectively having the maximum and minimum brightnesses, of the first and second image data refer to regions of the object of the first and second images.

Thus, the brightness difference between the maximum and minimum brightness portions can be obtained from the region of the object such as the manuscript. Accordingly, even if the taken image includes only the image of the object, a desired brightness difference can be obtained.

Preferably, the image processing apparatus further includes: an extracting portion extracting an edge area from at least one of the first and second images; and a controlling portion controlling to eliminate the effect of outside light by an eliminating portion for a region other than the extracted edge area and to eliminate the effect of outside light based on the elimination result of the outside light for the region other than the edge region for the extracted area.

Accordingly, the edge area is extracted from at least one of the first and second images. For the region other than the edge area, the effect of the outside light is eliminated by the eliminating portion. For the edge area, the effect of outside light is eliminated based on a correction result of the region other than the edge area where the effect of outside light has been eliminated.

Thus, also for the edge area which is subjected to a significant effect of image displacement due to shaking, the correcting process result of the region other than the edge area subjected to less effect is utilized to appropriately eliminate the effect of outside light.

Thus, an image processing apparatus can be provided which can appropriately correct to eliminate the effect of the outside light even if the taken image is displaced.

Preferably, the controlling portion includes an identifying portion identifying a proximity pixel of the region other than the edge area that corresponds to a target pixel in the extracted edge area. The controlling portion eliminates the effect of outside light of the target pixel based on the identified pixel value for which the effect of outside light has been eliminated.

Accordingly, a proximity pixel of the region other than the edge area that corresponds to the target pixel in the edge area is identified. The effect of outside light is eliminated by the eliminating portion for the identified proximity pixel, so that the effect of outside light of the target pixel is eliminated based on the result.

Since the result of the proximity pixel is used which is subjected to the effect of outside light in the closest manner as the target pixel is used, the effect of outside light can be more appropriately eliminated.

Preferably, the extracting portion is characterized in that it extracts the edge area from one of the first and second images with a maximum possible margin caused by shaking.

Preferably, the extracting portion is characterized in that it extracts a region determined as an edge area from at least one of the first and second images.

According to the present invention, the edge area extracted by the extracting portion has an area obtained by properly extending the actual edge area. Accordingly, even if displacement is caused to some extent due to shaking when the image is taken, the effect can be eliminated.

According to another aspect of the present invention, the image pickup apparatus is provided with an image processing apparatus that includes: an illuminating portion illuminating an object with light; an image pickup portion taking an image of the object; a first receiving portion receiving a first image of the object taken under a prescribed illuminating condition; a second receiving portion receiving a second image of the object taken under an illuminating condition different from a prescribed illuminating condition; and an eliminating portion eliminating an effect of outside light using the received first and second images. The eliminating portion includes: an adjusting portion adjusting at least one of the first and second images to equalize brightness differences of the first and second images; and a calculating portion calculating a difference between the first and second images that have been adjusted by the adjusting portion to have the same brightness difference. The first and second images are taken by the image pickup portion under different illuminating conditions of the illuminating portion.

Preferably, the image processing apparatus further includes: an extracting portion extracting an edge area from at least one of the first and second images; and a controlling portion controlling to eliminate the effect of outside light by the eliminating portion for a region other than the extracted edge area and to eliminate the effect of outside light based on the elimination result of the outside light for the region other than the edge region for the extracted edge area.

According to the present invention, the first and second images are taken by the image pickup portion under different illuminating conditions of the illuminating portion. At least one of the images is adjusted to equalize the brightness differences of these two images and, after the images come to have the same brightness difference, a difference between these two images is calculated. Thus, only the effect of outside light can be purely eliminated using the first and second images that have been subjected to the effect of the same outside light.

Thus, an image pickup apparatus can be provided which can eliminate the effect of outside light caused to the taken image.

According to a still another aspect of the present invention, an image processing method includes steps of: illuminating an object under a first illuminating condition to receive a first image of the object under a first receiving condition; illuminating the object under a second illuminating condition to receive a second image of the object under a second receiving condition. The second illuminating condition and the second receiving condition are respectively different from the first illuminating condition and the first receiving condition. The image processing method further includes steps of: modifying first image data and/or second image data to eliminate a difference between effects respectively caused to the first and second images under the first and second receiving conditions; and detecting a difference between the first and second images that have been modified by the modifying step.

According to the present invention, at least one of the first and second images taken under different illuminating conditions is modified to eliminate a difference between the effects caused to these images. After the difference between the effects caused to these images is eliminated, a difference between these two images is detected. Thus, by using the first and second images that have been subjected to effects of the same outside light, only the effect of outside light can be purely eliminated.

Accordingly, an image processing method can be provided which can eliminate the effect of outside light caused to the taken image.

Preferably, one of the first and second illuminating conditions refers to a condition of more intensively applying light than the other, and a factor common to the first and second illuminating conditions is eliminated based on the detected difference.

Thus, the difference between two images is detected after the difference between the effects caused to the first and second images is eliminated, so that the factor common to the first and second illuminating conditions is eliminated and only a light amount differing between the first and second illuminating conditions can be detected as a difference.

Preferably, the method further includes steps of: extracting an edge area from at least one of the first and second images; and modifying the extracted edge area based on the detected difference.

Thus, the edge area is extracted from at least one of the first and second images and the effect of outside light is eliminated based on the detected difference of the region other than the edge area from which the effect of outside light has been eliminated.

Accordingly, also for the edge area which is subjected to a significant effect of displacement of image due to shaking, by utilizing the detected difference of the region other than the edge region which is subjected to less effect the effect of outside light can be appropriately eliminated.

Thus, an imaging method can be provided which can appropriately perform correction for eliminating the effect of outside light even if there is displacement in the taken image.

Preferably, the receiving condition refers to a product of a shutter releasing time and an aperture opening area.

Each of the first and second receiving conditions refers to a product of the shutter releasing time and aperture opening area, so that these receiving conditions can be readily obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing images of the region enclosed by a dotted line A in FIG. 4A in the case of shaking and the region enclosed by a dotted line B in FIG. 4B arranged in the same position on a CCD.

FIG. 6 is an illustration showing a general structure of a scanner according to a first embodiment of the present invention.

FIG. 12 is a diagram showing an exemplary image taken under "non-illumination pickup" condition for explaining the lightest and darkest portions over a base of the image.

FIG. 19 is a diagram shown in conjunction with the result of a process of extracting an edge area for an image taken under "pickup with illumination" condition.

DESCRIPTION OF THE PREFERRED EMBODIMENTS

Generally, a scanner is provided with an automatic exposure (hereinafter abbreviated as "AE") function. By a method of simply subtracting an image when an illumination lamp is off from that when the illumination lamp is on, the effect of outside light cannot be reliably eliminated because of this AE function.

More specifically, with the AE function, the taken image has uniform brightness to eliminate a problem associated with thickening or saturation of the image. Thus, the taken image differs from a simple image having an illuminance distribution over a manuscript. Thus, even if a difference therebetween is simply taken, the effect of outside light cannot be eliminated. This problem will now be discussed with reference to FIGS. 1, 3A and 3B.

Figure 1:
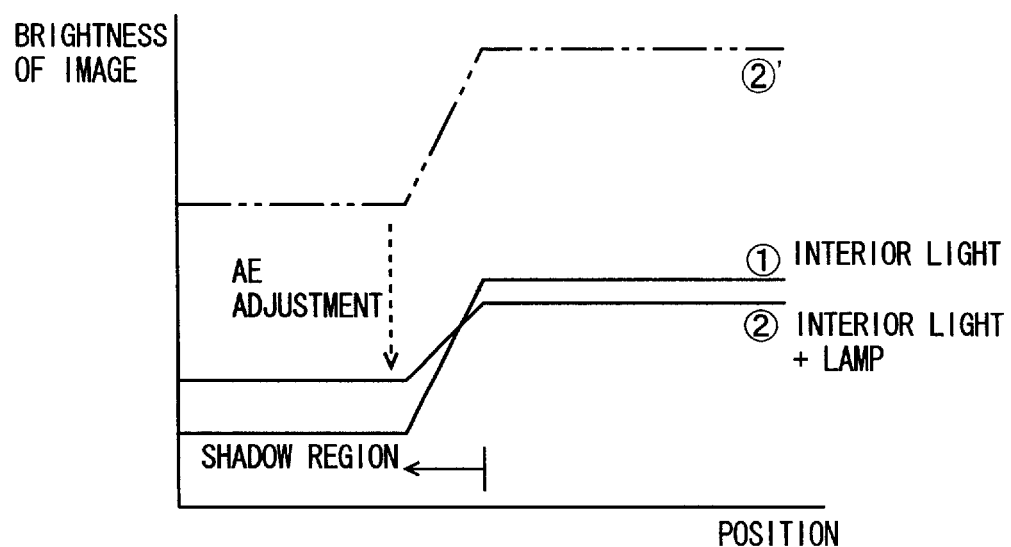
FIG. 1 is a graph showing brightnesses of an image of a manuscript when the illumination lamp in the apparatus shown in FIGS. 22A and 22B is turned on and off.
Figure 22A:
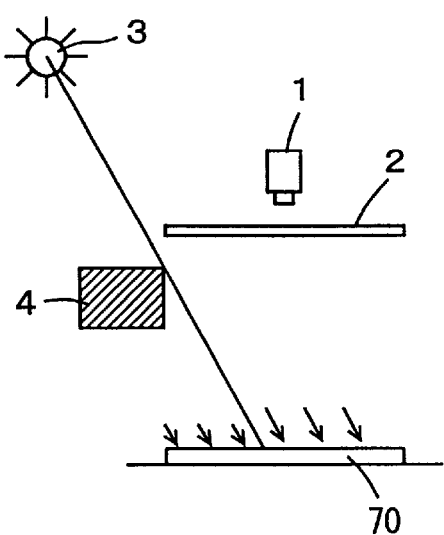
FIGS. 22A and 22B are diagrams shown in conjunction with shadows projected onto the manuscript due to the effect of the interior lamp.
Figure 22B:
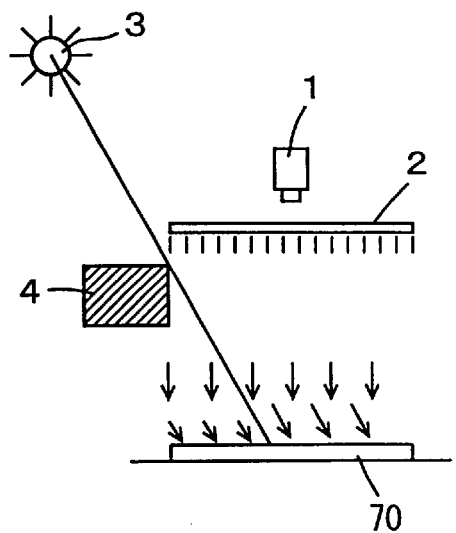
Figure 23:
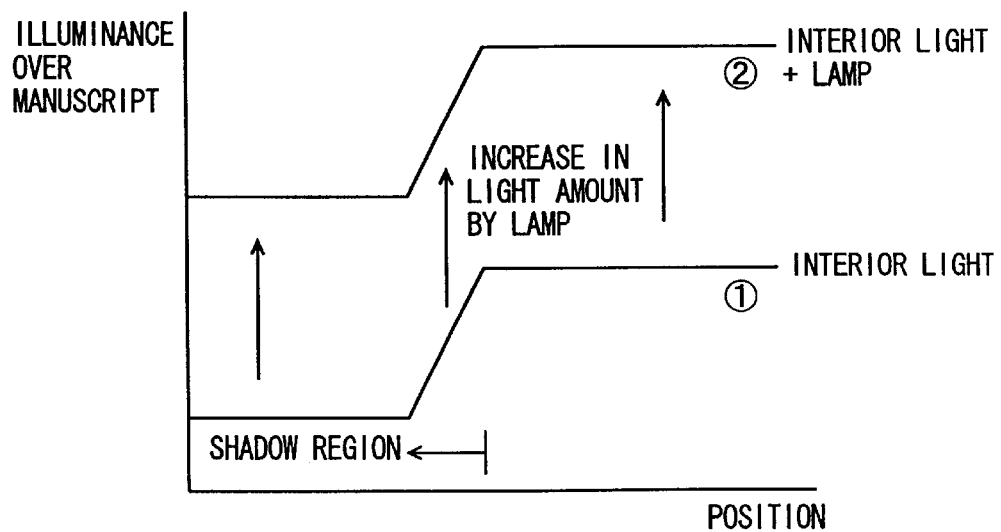
FIG. 23 is a graph showing an illuminance over the manuscript when the illumination lamp of the apparatus in FIGS. 22A and 22B are turned on and off.

FIG. 1 is a graph showing brightnesses of an image of a manuscript 70 when illumination lamp 2 of the apparatus shown in FIGS. 22A and 22B is turned on and off. A solid line ① shows a brightness of the image of the manuscript read by an optical head in the case of FIG. 22A, that is, in the case where only light from an interior lamp is directed to manuscript 70 with illumination lamp 2 being off. Because of AE adjustment, it differs to some extent from the illuminance distribution of the manuscript (① in FIG. 23).

A solid line ② shows a brightness of the image taken by optical head 1 in the case of FIG. 22B, that is, in the case where lights from both the interior lamp and illumination lamp are directed to manuscript 70 with illumination lamp 2 being on. In this case, the brightness significantly differs from that of the image denoted by ②' when AE adjustment is not performed, whereby uniform brightness is obtained.

Figure 2:
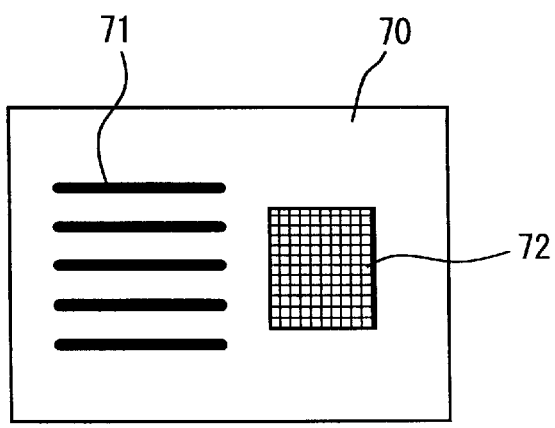
FIG. 2 is a diagram showing a manuscript to be image-taken.

This will be explained with reference to a drawing showing a taken image. FIG. 2 is a diagram showing manuscript 70 to be image-taken. As shown in this diagram, manuscript 70 includes a character region 71 and a picture region 72.

Figure 3A:
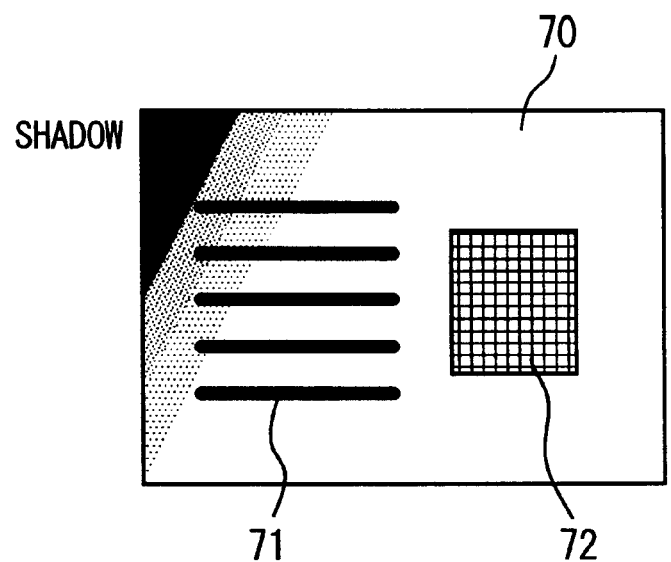
FIGS. 3A and 3B are diagrams showing images of the manuscript of FIG. 2.
Figure 3B:
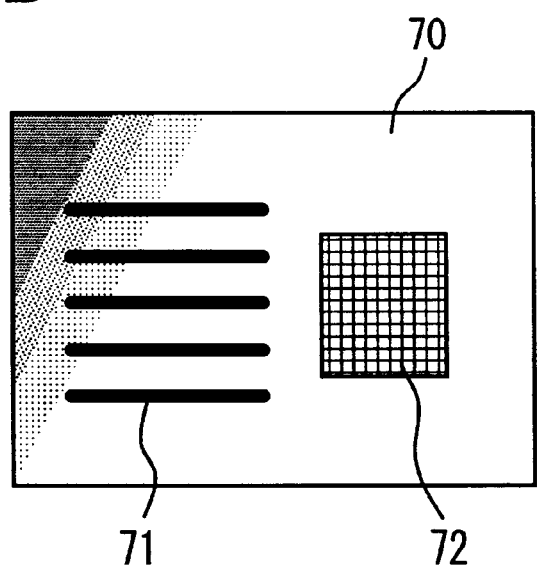

FIGS. 3A and 3B are diagrams showing images of manuscript 70 of FIG. 2. FIGS. 3A and 3B respectively show images taken when illumination lamp 2 is off and on. In either case, character region 71 has some shadow.

As shown in FIG. 3A, the image taken when illumination lamp 2 is off corresponds to ① in FIG. 1, and there is a significant difference in brightness between a shadow region and the region free from any shadow.

On the other hand, as shown in FIG. 3B, the image taken when illumination lamp 2 is on corresponds to ② in FIG. 1, where a uniform brightness is obtained because of AE adjustment and a smaller difference in brightness exists between the shadow region and the region free from any shadow as compared with the case of FIG. 3A. Accordingly, the brightness difference between portions of the image in FIG. 3A differs from that of FIG. 3B.

Thus, even if the image taken when the illumination lamp is off as shown in FIG. 3A is simply subtracted from that of FIG. 3B when the illumination lamp is on, the effect of a shadow or the like caused by the interior lamp cannot be eliminated. Thus, AE adjustment makes it difficult to eliminate the effect of a shadow or the like caused by outside light.

Further, when the effect of a shadow or the like caused by outside light is eliminated using images respectively taken when the illumination lamp of the apparatus is on and off, use of a hand-held scanner has another problem of image displacement due to shaking. This will be discussed in the following.

Figure 4A:
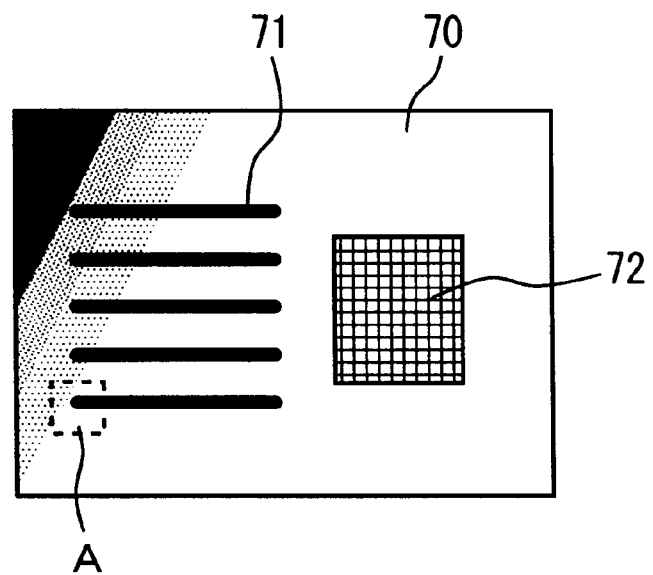
FIGS. 4A and 4B are diagrams shown in conjunction with displacement of images taken by a hand-held scanner when the illumination lamp of the apparatus is turned on and off.
Figure 4B:
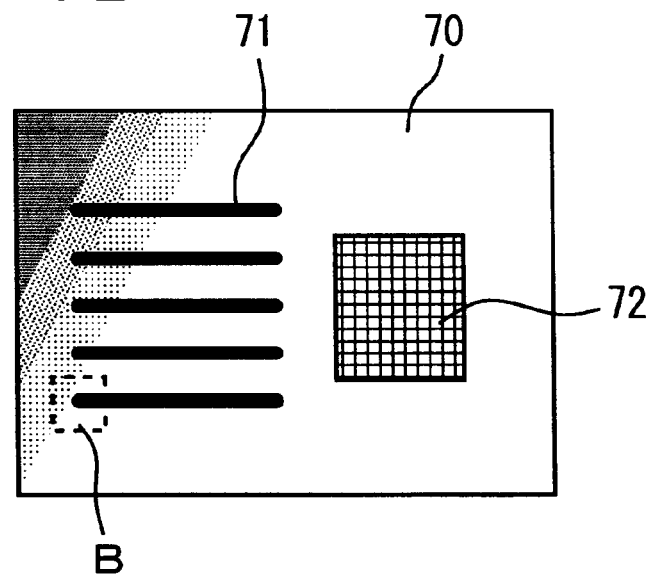

FIGS. 4A and 4B are diagrams shown in conjunction with displacement of the images respectively taken by a hand-held scanner when the illumination lamp of the apparatus is turned on and off. FIG. 4A shows the image of manuscript 70 taken when the illumination lamp is off, whereas FIG. 4B shows the image of manuscript 70 taken when the illumination lamp is on. Assume that shaking is caused when taking these images.

FIG. 5 is a diagram showing images of the region enclosed by a dotted line A in FIG. 4A in the case of shaking and the region enclosed by a dotted line B in FIG. 4B arranged in the same position on a CCD. Thus, shaking causes displacement of these two images. Accordingly, if there is displacement between two images, a method of correcting a shadow or the like by comparing the images in the same position on the image of manuscript cannot be employed.

To solve this problem, a process of aligning the images may be employed. However, in the case of shaking, magnification changes due to rotation or horizontal movement in addition to vertical movement. As a result, intensive calculation is required to find all of these displacement parameters, making the apparatus impractical.

Now, embodiments of the present invention will be described with reference to the drawings.

First Embodiment

FIG. 6 is an illustration showing a general structure of a scanner according to a first embodiment of the present invention. Referring to FIG. 6, a scanner 100 includes a base 40 on which a manuscript is placed, an operation panel 30 provided on base 40, an optical head 10 provided at the top portion of a pole on base 40, and an illumination lamp 20 which is also provided at the pole for illuminating base 40 with light with a uniform illuminance distribution.

Optical head 10 includes a lens 13 for collecting light from the manuscript onto a CCD, and a CCD 11 which is an image pickup sensor for converting the collected light to an electrical signal. Operation panel 30 includes a set key 33 for setting a pickup range (a manuscript size) or thickness, and a start key 31 for starting image pickup.

Figure 7:
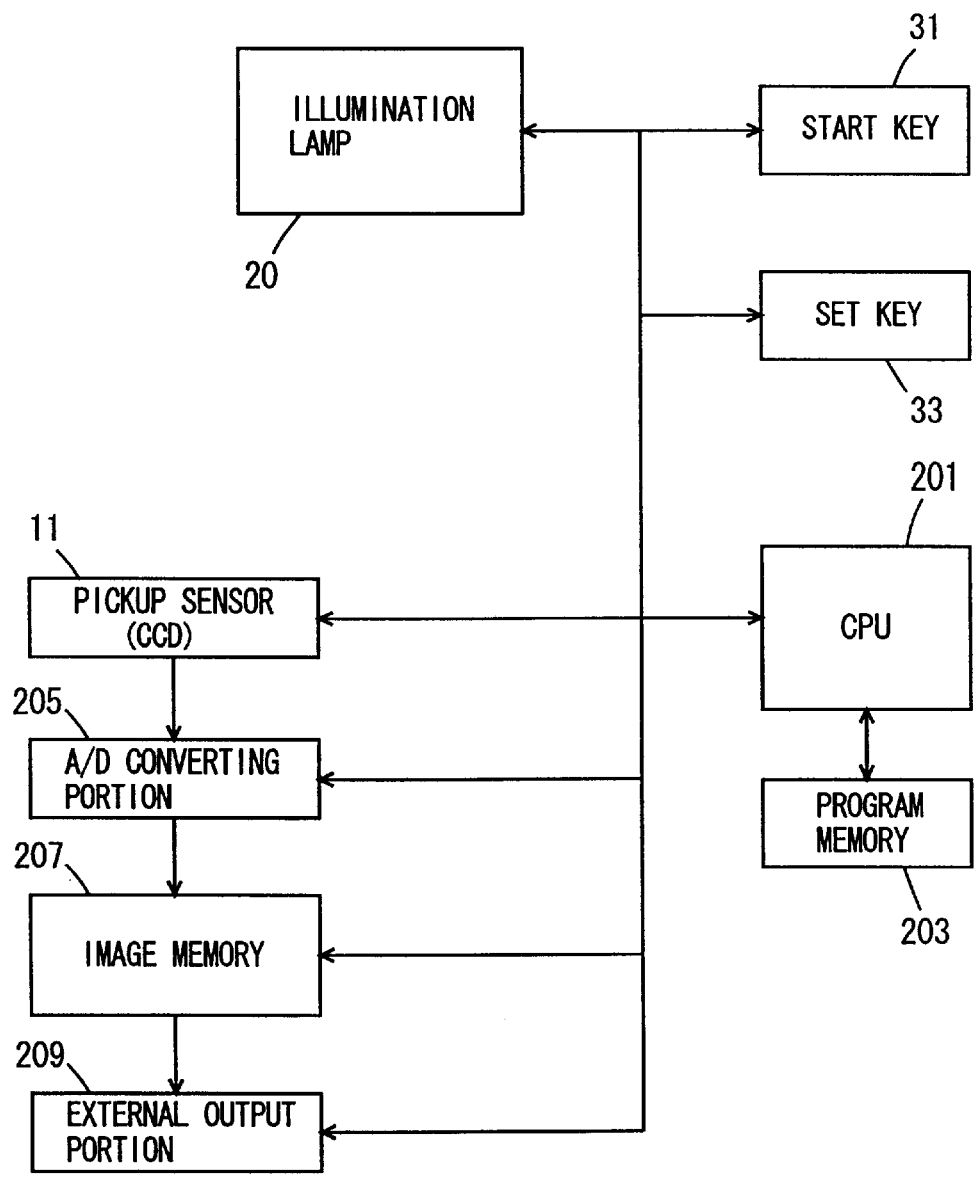
FIG. 7 is a block diagram showing a structure of a processing system related to control and image processing of the scanner in FIG. 6.

FIG. 7 is a block diagram showing a structure of a processing system related to control and image processing of the scanner in FIG. 6. Referring to FIG. 7, scanner 100 includes: a CPU (Central Processing Unit) 201 for controlling an operation of scanner 100, performing an image process or the like; a program memory 203 of a non-volatile memory for storing a process program performed by CPU 201; an illumination lamp 20; start key 31; set key 33; image pickup sensor (CCD) 11 converting an optical signal of image information to an electrical signal; an A/D converting portion 205 converting analog data output from image pickup sensor (CCD) 11 to digital data; an image memory 207 storing pickup image data and the like output from A/D converting portion 205; and an external output portion 209 of an interface with respect to a personal computer, printer or the like.

Image data obtained by image pickup sensor 11 is converted to digital data by A/D converting portion 205 and temporarily stored in image memory 207. During an image process, the stored image data is read out or written by CPU 201. The image data which has been subjected to the image process is transmitted to an external personal computer, printer or the like, through external output portion 209.

Figure 8:
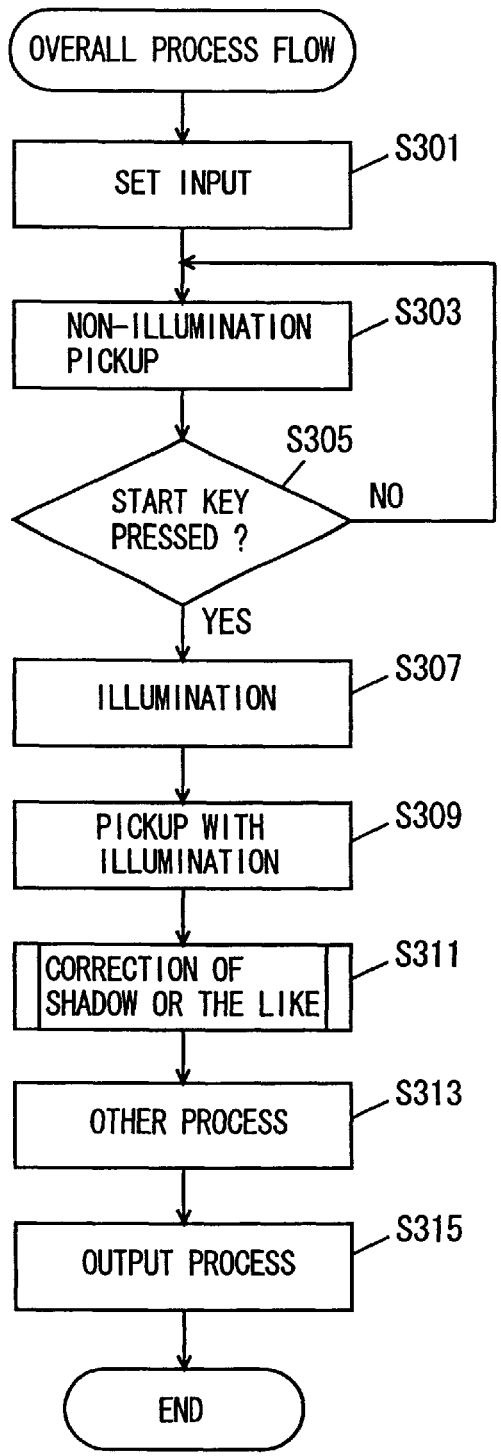
FIG. 8 is a flow chart showing a general process flow of the scanner during image pickup operation.

Now, a flow of image taking by scanner 100 will be described. FIG. 8 is a flow chart showing a general flow of process of the scanner 100 during image pickup operation. Referring to FIG. 8, in a step S301, a user performs input for setting. More specifically, set key 33 of operation panel 30 is pressed to set the image pickup range (manuscript size), thickness and the like.

Next, in a step S303, non-illumination pickup is performed. Namely, image data is read out by CCD 11 with illumination lamp 20 turned off.

In a step S305, a determination is made as to if a user has pressed start key 31. If start key 31 has not been pressed ("No" in step S305), a process returns to step S303 for performing non-illumination pickup. Thus, until start key 31 is pressed, non-illumination pickup (step S303) is repeated at prescribed intervals.

Here, the taken image data is stored in a region for "non-illumination pickup" image of image memory 207 and is sequentially updated with the latest one. Thus, eventually, a manuscript is set by a user on manuscript base 40 and data of image immediately before start key 31 is pressed is stored in the region for "non-illumination pickup" image of image memory 207 as data of "non-illumination pickup" image. Meanwhile, exposure value EV (a product of a shutter releasing time and an aperture opening area) at the time of non-illumination pickup is stored along with image data.

Note that, when start key 31 is pressed, if "non-illumination pickup" image taken in step S303 is in the process of being transferred to image memory 207, the process waits for completion of transfer before proceeding to a following process.

Thus, immediately after start key 31 is pressed, "pickup with illumination" is performed since "non-illumination pickup" is automatically performed before start key 31 is pressed. As a result, a total amount of pickup time is reduced.

When start key 31 is pressed ("Yes" in step S305), illumination lamp 20 emits light in a step S307, and "pickup with illumination" is performed in a step S309. Here, if illumination lamp 20 emits light for a short period of time, i.e., if illumination lamp 20 is formed of an electronic flash or the like, illumination lamp 20 may be turned on at the time of the pickup process in step S309.

Then, data of "pickup with illumination" image taken in step S309 is newly stored in a region different from that for "non-illumination pickup" image of image memory 207. Meanwhile, exposure value EV (a product of a shutter releasing time and an aperture opening area) at the time of pickup with illumination is also stored.

Upon completion of pickup with illumination, in a step S311, a process of correcting a shadow or the like is performed. More specifically, a process of correcting to eliminate the effect of a shadow or the like due to outside light is performed using "non-illumination pickup" and "pickup with illumination" images stored in image memory 207.

Upon completion of correction of the shadow or the like, in a step S313, the other processes are performed. Namely, a process directed to improve image quality or a general image process for adapting to an output device, e.g., color balancing adjustment, scaling, gradient correction, background elimination, a digitizing process with area gradation, are performed.

Then, in a step S315, ultimate image data is output to an external apparatus such as a personal computer or printer connected to scanner 100 in accordance with an interface specification of external output portion 209. Note that the image data may be recorded onto a recording medium such as an HD (Hard Disk) or PC card rather than being output to the external apparatus through the interface.

Figure 9:
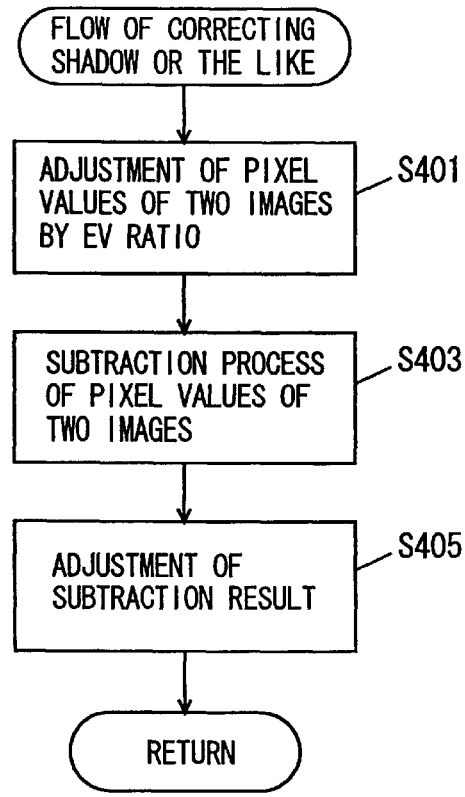
FIG. 9 is a flow chart showing in detail a process of correcting a shadow or the like (a step S311) in FIG. 8.

FIG. 9 is a flow chart showing in detail a process of correcting a shadow or the like (step S311) in FIG. 8. Referring to FIG. 9, in the process of correcting the shadow or the like, in a step S401, a pixel value (a brightness value of each pixel) is adjusted by an EV ratio of "non-illumination pickup" and "pickup with illumination" images.

As stated previously, even if the image taken with illumination lamp 20 being off ("non-illumination pickup" image) is simply subtracted from that with illumination lamp 20 being on ("pickup with illumination" image), the effect of a shadow or the like caused only by the interior lamp would not be eliminated because of the brightness difference between the images each subjected to AE adjustment.

Therefore, either "pickup with illumination" image or "non-illumination pickup" image must be modified to have a brightness that satisfies a pickup condition (an exposure condition) of the other image. Here, assume that "pickup with illumination" image is modified to satisfy the exposure condition of "non-illumination pickup" image. If the brightnesses of "pickup with illumination" and "non-illumination pickup" images are respectively P r+s(xi) and Pr (xi), brightnesses P' r+s(xi) and P' r (xi), respectively of "pickup with illumination" and "non-illumination pickup" images after modification, are represented by the following equations.

$$P'r(xi) = Pr(xi)$$

$$P'r+s(xi) = \frac{Evr}{Evr+s}Pr+s(xi)$$

Here, EVr+s and EVr respectively represent exposure values at the time of "pickup with illumination" and "non-illumination pickup." In addition, xi generally represents coordinates of the two-dimensional position of the taken image or a corresponding manuscript. Thus, the brightness of "pickup with illumination" image is modified.

Note that, although the brightness of "pickup with illumination" image is adjusted with respect to "non-illumination pickup" image, the former may be used as a reference. Namely, the brightness of "non-illumination pickup" can be modified with respect to "pickup with illumination" image. In this case, "non-illumination pickup" image would be modified to satisfy the exposure condition for "pickup with illumination" image.

Thus, when the brightness of one of these two images is modified (here "pickup with illumination" image is modified), in a step S403, a process of subtracting pixel values of two images is performed. Namely, by subtracting data of "non-illumination pickup" image from "pickup with illumination" image, the effect of a shadow or the like caused by the interior lamp can be eliminated.

This will be explained using mathematical equations. When the light from the interior lamp is directed, i.e., at the time of "non-illumination pickup," the illuminance of the manuscript is represented as (illuminance when no shield exist)−(effect caused by a shadow of the shield). When illumination lamp 20 is on, i.e., at the time of "pickup with illumination," the illuminance equals to this value added with "illuminance by lamp." Thus, the actually taken image is represented by a product of the illuminance of the manuscript and a reflectance of the manuscript and an attenuation varying with a distance. Given that the illuminance of the manuscript without any shield is Lr (xi), the effect caused by the shield D(xi), the illuminance of the manuscript by the lamp Ls (xi), reflectance R (xi), and attenuation rate α, the following equations are obtained.

$$P'r(xi)=(Lr(xi)-D(xi))\times R(xi)\times \alpha$$

$$P'r+s(xi)=((Lr(xi)-D(xi))+Ls(xi))\times R(xi)\times \alpha$$

Based on these equations, the reflectance of the manuscript is found to be R (xi)=(P' r+s (xi)−P' r (xi))/(α×Ls (xi)). Thus, a value obtained by subtracting a brightness value of "pickup without illumination" image from that of "pickup with illumination" image after modification, i.e., (P' r+s(xi)−P' r(xi)), corresponds to reflectance R (xi) of the manuscript free from any effect D (xi) of a shadow or the like, i.e., manuscript concentration per se.

Consequently, once brightness difference (P' r+s (xi)−P' r (xi)) that can be actually calculated after modification is found in step S403, in step S405, the subtraction result is adjusted. More specifically, a process is performed which adjusts a range of subtraction value (P' r+s (xi)−P' r (xi)) (a range of reflectance R (xi)) to a range of actual brightness value P r+v (xi) obtained by AE adjustment. For example, by adjusting an average value of subtraction value (P' r+s (xi)−P' r (xi)) and brightness value P r+v (xi) obtained by AE adjustment to a contrast, the brightness distribution widths are equalized. Thus, a desired pixel value can be readily and reliably obtained.

Note that, if the illuminance of the manuscript by the lamp is unchanged, Ls (xi) would be a constant independent of xi, whereby calculation is further facilitated.

By the above described processes, correction is performed using image in FIG. 3A before lamp illumination that is subjected to the effect of a shadow or the like and image in FIG. 3B after lamp illumination. Eventually, a desired image of the manuscript free from any effect of a shadow or the like can be obtained.

Therefore, with scanner 100 of the present embodiment, the effect of a shadow or the like caused by outside light can be appropriately eliminated even if provided with AE function.

Although the EV, that is an exposure condition for non-illumination pickup and pickup with illumination respectively in steps S303 and S309 in FIG. 5, may be stored in a memory of a scanner as in the present embodiment, it may be recorded onto a header portion of image data for subsequent output. When recorded in the header portion, a process of correcting a shadow or the like can be performed outside the scanner.

Namely, pickup of the image is performed by a scanner and the taken "non-illumination pickup" and "pickup with illumination" images are transmitted to an external personal computer or the like along with EV, and the process of correcting the shadow or the like may be performed in the external portion e.g., in the personal computer.

First Modification

Now, a modification of scanner 100 of the first embodiment of the present invention will be described. The scanner of the first modification has a structure similar to that of scanner 100 of FIG. 6, forming a block diagram as shown in FIG. 7. Note that the content of the processing program stored in program memory 203 is slightly different from the block diagram of FIG. 7.

In the present modification, the effect of a shadow or the like is eliminated using images taken when illumination lamp 20 is turned on and off. However, a method of modifying one of "non-illumination pickup" image and "pickup with illumination" image which have been subjected to AE adjustment is different from that of scanner 100 of the first embodiment.

Namely, in scanner 100, the pixel value is modified based on an exposure value EV that refers to an image taking condition for "non-illumination pickup" and "pickup with illumination," as described in conjunction with step S401 of FIG. 4. On the other hand, in the present modification, the brightness of the image is modified using the brightness difference between a portion of the taken image having the highest brightness (hereinafter referred to as "the lightest portion") and a portion having the lowest brightness (hereinafter referred to as "the darkest portion"), rather than using the EV ratio.

Figure 10:
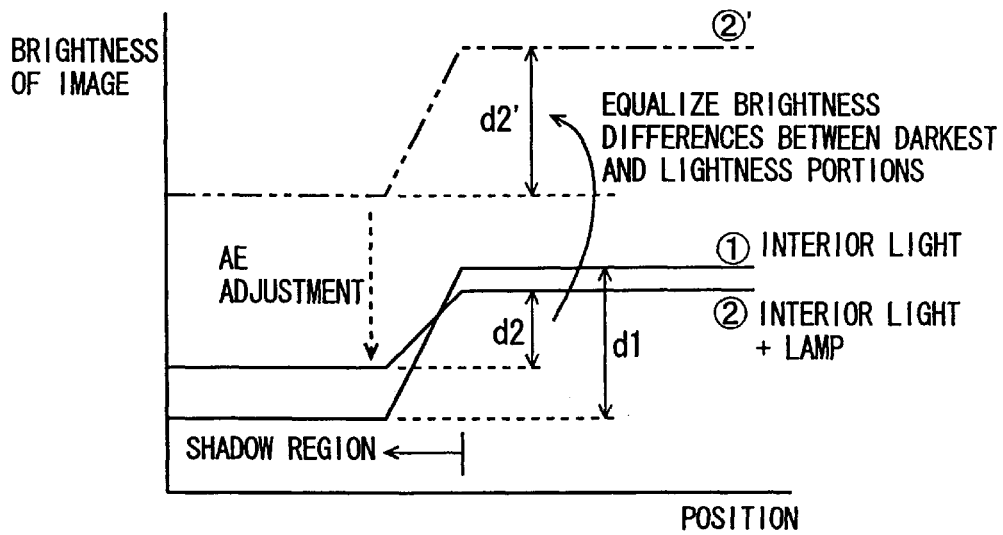
FIG. 10 is a graph showing illuminances of images taken under "non-illumination pickup" and "pickup with illumination" conditions shown in conjunction with a principle of modifying an illuminance value of an image according to a first modification.

FIG. 10 is a graph showing brightnesses of "non-illumination pickup" and "pickup with illumination" images used for explaining a principle of modifying the brightness value of the image. Referring to FIG. 10, solid line ① shows the brightness in the case of only interior lamp, i.e., in the case of "non-illumination pickup" image. On the other hand, solid line ② shows a brightness in the case of both interior lamp and illumination lamp, i.e., in the case of "pickup with illumination" image.

Both "non-illumination pickup" and "pickup with illumination" images are subjected to AE adjustment and, therefore, these images have the uniform brightness, although each image has a different brightness difference as is apparent from ① and ②. As such, brightness differences d1 and d2 between the lightest and darkest portions of each image also differ. Then, the brightness value of one image is modified to satisfy the exposure condition of the other image, so that the brightness differences between the lightest and darkest portions match.

Brightness values P' r (xi) and P' r+s (xi) obtained by modifying the exposure amounts are represented as follows. Here, similarly, the condition for "pickup with illumination" image is adapted to the exposure condition for "non-illumination pickup" image for modification of the brightness values.

$$P'r(xi)=Pr(xi) \qquad (1)$$

$$P'r+s(xi)=G\times P\ r+s(xi) \qquad (2)$$

Note that G is an unknown factor used for modification of the exposure value difference.

Some illumination lamp 20 does not cause any illuminance difference over the manuscript, so that the same illuminance distribution is obtained over the manuscript for "non-illumination pickup" and "pickup with illumination." This means that brightness differences d1 and d2' between the lightest and darkest portions for brightnesses ① and ② respectively for "non-illumination pickup" image and "pickup with illumination" image in FIG. 5 are equal under the same exposure condition.

It is noted that the lightest and darkest portions at the base of "non-illumination pickup" image and "pickup with illumination" images are respectively at the same positions.

Accordingly, by utilizing the fact that the illuminance differences of the lightest portion (xA) and the darkest portion (xB) over the base of "non-illumination pickup" image and "pickup with illumination" images are the same, a relation of P' r+s (xA)−P' r+s (xB)=P' r (xA)−P' r (xB) is established.

By assigning equations (1) and (2) in the above relation to find G, G is found to be G=(Pr (xA)−Pr (xB))/(P r+s (xA)−P r+s (xB)). Thus, unknown factor G is obtained by the brightness difference between the lightest and darkest portions for each of "non-illumination pickup" and "pickup with illumination" images.

Once factor G is found, then, P'0 r+s (xi) is found from equation (2). Accordingly, brightness ② of "pickup with illumination" image can be modified to brightness ②' that satisfies the exposure condition of "non-illumination pickup" image.

As described above, in the present modification, the brightness value over the base of the actually taken image is used, rather than EV ratio as in scanner 100 of the first embodiment, so that the same brightness are attained for "non-illumination pickup" and "pickup with illumination" images that satisfy the same exposure condition.

Next, a pickup operation of the scanner of the first modification will be described. A flow of process of the general pickup operation is the same as that of the flow chart of FIG. 8. Note that, in the present modification, acquisition and storage of EV are not performed in steps S303 and S309 since EV ratio is not used. In addition, a specific content of the process of modifying a shadow or the like in step S311 of FIG. 8 also differs.

Figure 11:
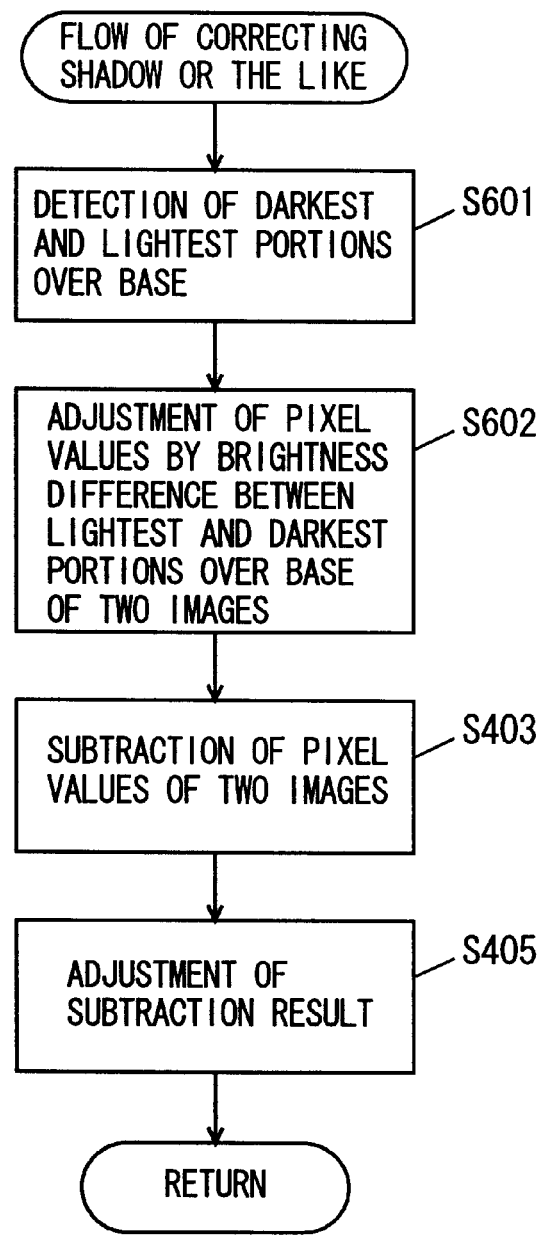
FIG. 11 is a flow chart showing in detail a process of correcting a shadow or the like (a step S311 in FIG. 8) according to the first modification.

FIG. 11 is a flow chart showing in detail a process of correcting a shadow or the like (step S311 of FIG. 8) in the first modification. Referring to FIG. 11, first, in step S601, the darkest and the lightest portions over the base of the taken image are detected.

FIG. 12 is a diagram showing an exemplary "non-illumination pickup" image to explain the lightest and darkest portions over the manuscript base of the image. Referring to FIG. 12, a base portion 73 exists around manuscript portion 70 of the taken image. Here, xB and xA respectively indicate the darkest portion with a shadow and the light portion without any shadow. Although not shown, lightest darkest portions xA and xB of "pickup with illumination" image are in the same positions as lightest and darkest portions xA and xB of "pickup with illumination" image.

Once lightest portion xA and the darkest portion xB over the base are detected, in a step S602, a pixel value is adjusted based on the brightness difference between the lightest and darkest portions over the base of two images. Namely, the brightness of "pickup with illumination" denoted by ② in FIG. 10 is modified to the brightness of the image that satisfies the exposure condition denoted by ②'.

Note that, although the brightness of "pickup with illumination" image (② in FIG. 10) is modified with respect to the brightness of "non-illumination pickup" image (① in FIG. 10), the modification may be performed in the opposite way.

When modification of the brightness of one image is completed, the process proceeds according to the flow of FIG. 9. More specifically, in step S403, a subtraction process is performed on pixel values of two images, one which has been modified and the other which has not been modified. In step S405, the subtraction result is adjusted. Then, the ultimate desired pixel value is obtained.

As described above, since the brightnesses of the images are modified to have the same exposure amount using the brightness difference between the lightest and darkest portions over the base of the taken image, the effect of a shadow or the like can be eliminated even if EV ratio is unknown during pickup operation.

Second Modification

In the first modification, one image is modified by using the brightness difference between the lightest and the darkest portions over the base of the taken image. In the present modification, one image is modified by using the brightness difference between the lightest and the darkest portions of the manuscript portion rather than the base portion of the image.

Figure 13:
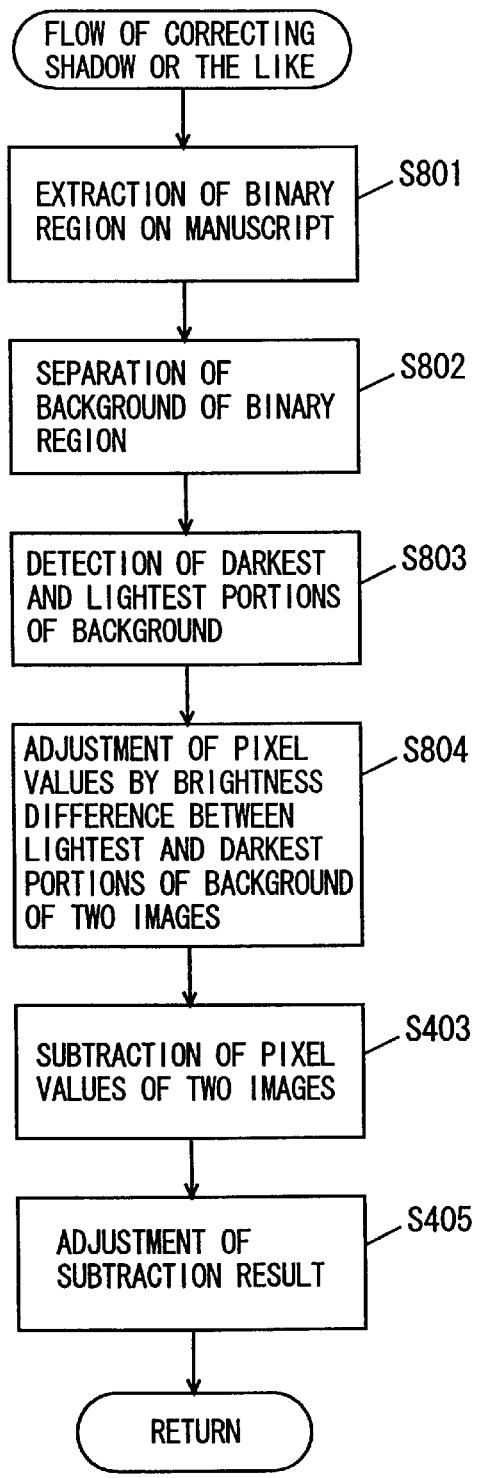
FIG. 13 is a flow chart showing in detail a process of correcting a shadow or the like (step S311 in FIG. 8) according to a second modification.

FIG. 13 is a flow chart showing in detail a process of correcting a shadow or the like (step S311 of FIG. 8) in the second modification. The process of correcting a shadow or the like caused by the scanner in the present modification involves processes of steps S801 to S804 instead of steps S601 and S603 of FIG. 11. The other processes are the same as in FIG. 11.

Referring to FIG. 13, in the present modification, in step S801, binary regions over the manuscript of the taken image are extracted. This is performed for finding the brightness at the base portion of the manuscript by extraction of binary regions.

In detecting, for example, the taken image is divided into blocks of 8×8 pixels, and a block is determined that satisfies all of or any of conditions "large brightness difference (brightness difference between the base and character)," "high maximum brightness (white base)," "low minimum brightness (thick character)," "there are two peaks at the low and high brightness portions in histogram." Then, a portion having these blocks successively arranged in a given range is detected.

Figure 14:
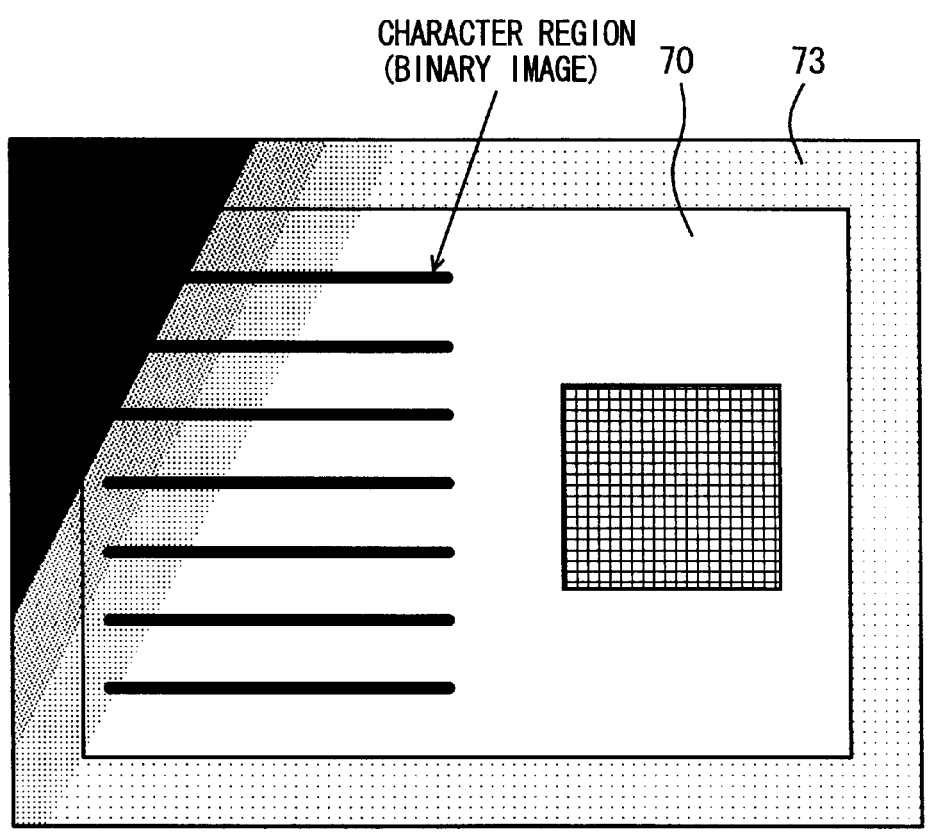
FIG. 14 is a diagram showing that binary regions are in the detected "non-illumination pickup" image.

Consequently, in FIG. 14 that shows the "non-illumination pickup" image, for example, a character region shown on the left side of manuscript image 70 would be detected as a binary region. Note that the same region is detected as the binary region also for the "non-pickup with illumination" image.

Once the binary region is detected, a process of separating the manuscript background in the binary region is performed in step S802. In step S803, for each of "non-illumination pickup" and "pickup with illumination" images, a process of detecting the darkest and the lightest portions of the separated manuscript background is performed.

Figure 15:
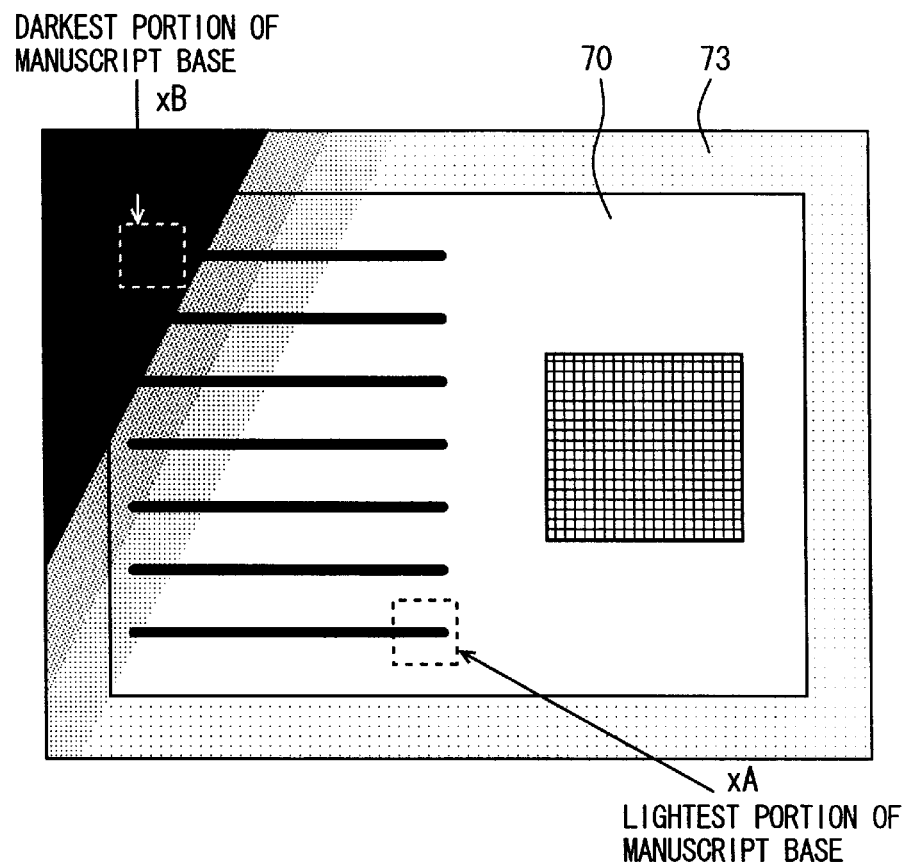
FIG. 15 is a diagram showing that the base of the manuscript is separated in the detected binary region of FIG. 14 and that the lightest and the darkest portions are detected.

FIG. 15 is a diagram shown in conjunction with separation of the manuscript background in the detected binary region of FIG. 14 and detection of the portions having the lowest and highest brightness. As shown in FIG. 15, xB in a shadow portion and xA free from any shadow respectively correspond to the darkest and lightest portions of the manuscript background.

Thus, for each of "non-illumination pickup" and "pickup with illumination" images, darkest portion xB and lightest portion xA of the manuscript background are detected. Then, in step S804, one of the taken images is modified using the brightness difference between lightest portion xA and the darkest portion xB.

More specifically, the method is the same as in the first modification, in which the brightness difference between lightest and darkest portions xA and xB of the base is modified. Namely, lightest portion xA and the darkest portion xB of the base detected in step S803 are simply used in stead of those of the first modification.

Accordingly, as in the first modification, for example, the brightness of "pickup with illumination" denoted by ② in FIG. 10 is modified to the brightness denoted by ②' that satisfies the exposure condition.

Note that, the brightness of "non-illumination pickup" image may be modified with reference to brightness (② of FIG. 10) of "pickup with illumination" image rather than brightness (① of FIG. 10) of "non-illumination pickup."

Once modification of the brightness of one image is completed, the process proceeds according to the flow of processes shown in FIGS. 9 and 11. Namely, in step S403, a subtraction process is performed on pixel values of two images, i.e., one image that has been modified and the other image that has not been modified. In step S405, the subtraction result is adjusted. Then, ultimate pixel values are calculated.

As described above, in the present modification, the brightness difference between the lightest and the darkest portions over the base of the taken image is used, so that the brightness of one image can be appropriately modified even if there is no manuscript base region in the taken image.

Second Embodiment

Finally, a hand-held scanner 200 of the second embodiment of the present invention will be described.

Figure 16:
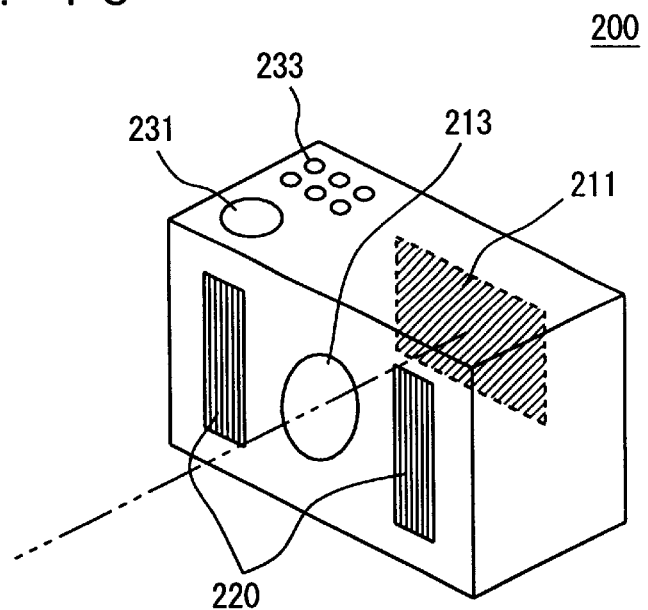
FIG. 16 is a diagram showing a general structure of a hand-held scanner according to the second embodiment of the present invention.

FIG. 16 is a diagram showing a general hand-held scanner of the second embodiment of the present invention. Referring to FIG. 16, hand-held scanner 200 includes: a lens 213 for collecting light from a manuscript onto a CCD; a CCD 211 which is a pickup sensor for converting the collected light to an electrical signal; an illumination lamp 220 capable of illuminating an object with light with a uniform illuminance distribution; a user set key 233 used by a user for setting a pickup range (a manuscript size) or thickness; and a start key 231 for starting pickup.

Figure 17:
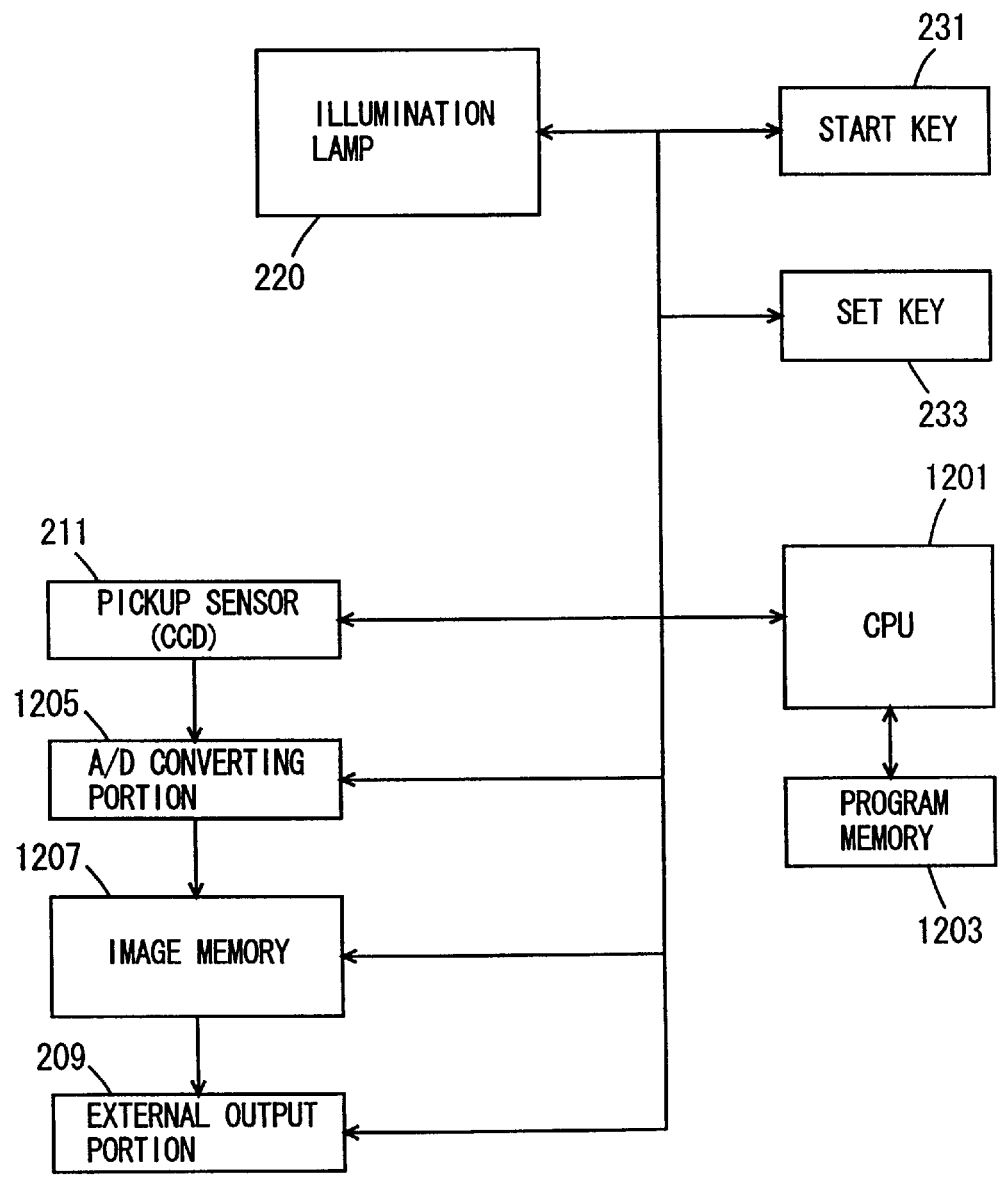
FIG. 17 is a block diagram showing a structure of a processing system related to control and image processing of the hand-held scanner of FIG. 16.

FIG. 17 is a block diagram showing a structure of a processing system related to control and image process of hand-held scanner of FIG. 16. Referring to FIG. 17, as in the case of scanner 100 of FIG. 7, a hand-held scanner 200 includes: a CPU 1201; a program memory 1203; an illumination lamp 220; a start key 231; a set key 233; a pickup sensor (CCD) 211; an A/D converting portion 1205; an image memory 1207; and an external output portion 1209.

Thus, image data that has been read by image sensor 211 is converted to digital data by A/D converting portion 1205 and temporarily stored in image memory 1207. When an image process is performed, the stored image data are read out and written in by CPU 1201. The image data that has been subjected to the image process is transmitted to an external personal computer, printer or the like through external output portion 1209.

Figure 18:
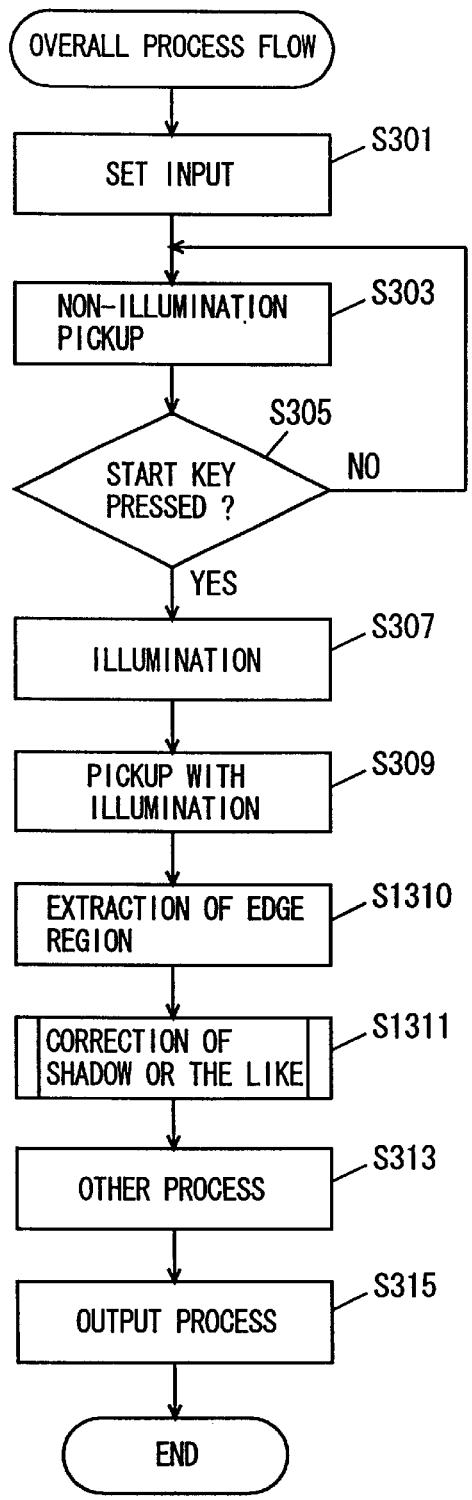
FIG. 18 is a flow chart showing a general flow of the hand-held scanner during an image pickup operation.

Then, a flow of pickup process of hand-held scanner 200 will be described. FIG. 18 is a flow chart showing a general flow of a pickup operation performed by hand-held scanner 200. The process flow of hand-held canner 200 is the same as that of scanner 100 of FIG. 8, except for the following points. More specifically, the process of correcting a shadow or the like in step S1311 differs from that of step S311 of FIG. 8. In addition, in the present embodiment, a process of extracting an edge area (step S1310) is added before correcting a shadow or the like in step S1311.

Referring to FIG. 18, the processes from steps S301 to S309 are the same as those of FIG. 8. In step S301, first, a user performs setting input. Then, in step S303, non-illumination pickup is performed. Subsequently, the non-illumination pickup (step S303) is repeated at prescribed intervals until start key 231 is pressed.

The taken image data is stored in a region for "non-illumination pickup" image of image memory 1207. The image data is sequentially updated with the latest one and, eventually, the image data obtained immediately before start key 231 is pressed is stored.

When start key 231 is pressed, in step S307, illumination lamp 220 emits light. In step S309, pickup with illumination is performed. Then, data of "pickup with illumination" image that has been taken in step S309 is newly stored in a region which differs from that for "non-illumination pickup" image in image memory 1207. The process so far is similar to that of FIG. 8.

When pickup with illumination is completed, a process of extracting an edge region is performed in step S1310. If "non-illumination pickup" image obtained by step S303 and "pickup with illumination" image obtained by step S309 are displaced in position by shaking or the like, correction of a shadow or the like cannot be appropriately performed. Thus, an edge region is extracted for providing different correcting methods thereafter, depending on the edge region and the region other than the edge region.

In extracting the edge region, a change in thickness near a target pixel is detected using a well known differential operator, which change amount is used for determining a portion having at least a prescribed value as an edge region.

Note that, although the process of extracting the edge region may be performed for two images of "non-illumination pickup" and "pick with illumination," it is preferably performed for "illumination with pickup" image with less amount of shadow change, which allows more accurate determination of the edge region.

FIG. 19 is a diagram shown in conjunction with a result obtained by a process of extracting the edge region for "pick with illumination" image. As shown in FIG. 19, edge region E with a shadow corresponds to edges of the actually detected images with a margin of a maximum possible width caused by shaking.

Having thus increased width with a margin, even if "non-illumination pickup" image is displaced by shaking, the edge image falls in the edge region of "pickup with illumination" image.

Note that when a process of extracting the edge regions is performed on both of "non-illumination pickup" and "pickup with illumination" images, for example, a region determined as an edge region in at least one image may be included in edge region E for edge extraction.

Thus, once extraction of the edge region is completed, a process of correcting a shadow or the like is performed successively in step S1311. Namely, using "non-illumination pickup" and "pickup with illumination" images stored in image memory 207, the effect of a shadow or the like due to outside light is eliminated.

Note that, here, by appropriately changing a correction method for the edge region in step S1310 and the region other than the edge region, the effect caused by shaking is eliminated.

Subsequently, as in the flow chart of FIG. 8, in step S313, color balance adjustment, scaling or the like is performed. In step S315, the ultimate image data is output to an external apparatus such as a personal computer or printer. Note that, in the outputting process, the image data may be recorded onto a recording medium such as an HD or PC card.

Figure 20:
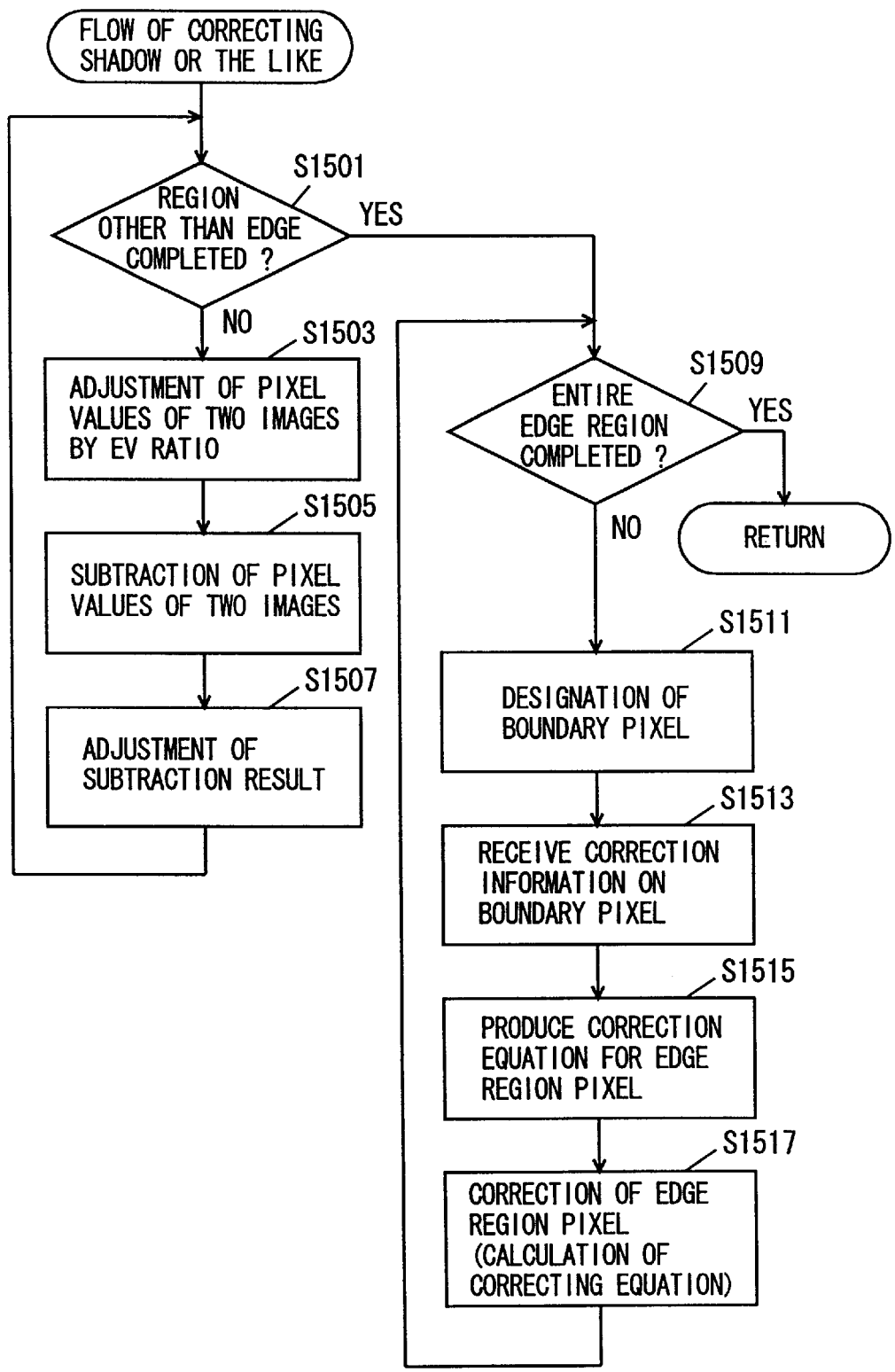
FIG. 20 is a flow chart showing in detail a process of correcting a shadow or the like (a step S1311) in FIG. 18.

FIG. 20 is a flow chart showing in detail a process of correcting a shadow or the like (step S1311) of FIG. 18. Here, the region other than the edge region is corrected and, based on the result, the edge region is corrected.

Namely, for the edge region which is significantly affected by displacement of image due to shaking, correction is not performed by two images. Rather, correction is performed based on the correction result for the region which is less affected (the region other than the edge region which has a relatively moderate amount of change in thickness due to a shadow).

Referring to FIG. 20, in a step S1501, a determination is made as to if the correction of the region other than the edge region has been completed. Then, if the correction has not yet been completed, a process of correction corresponding to steps S1503 to S1507 is performed. The process is the same as in FIG. 9 (steps S401 to S405).

When correction of the region other than the edge region is completed, in steps S1509 to S1517, the edge region is corrected. As stated previously, correction is made based on the correction result of the region other than the edge region.

First, in step S1509, a determination is made as to if correction for the entire edge region has been completed. If not, a boundary pixel is identified in step S1511. This is for estimating the value of a target pixel based on correction information on a proximity pixel (boundary pixel) having a shadow projected under a condition similar to that of a pixel (target pixel) in the edge region subjected to current correction.

Figure 21:
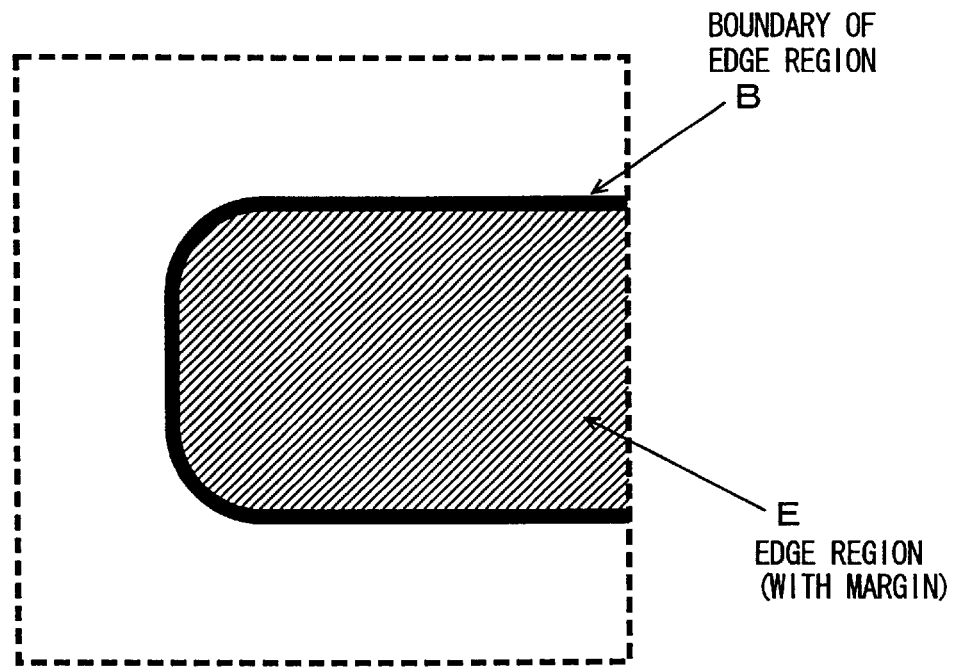
FIG. 21 is a diagram showing in enlargement a portion of an edge area E in FIG. 19, showing the edge area and its boundary.

Here, to explain the edge region and its boundary, FIG. 21 shows a part of edge region E of FIG. 19 in enlargement. Referring to FIG. 21, a peripheral portion (portion without shadow) B of edge region (shadow portion) E with a margin corresponds to a portion of the boundary pixel of edge region E. Accordingly, for correction of the pixels in edge region E, pixels at peripheral boundary B are selected as boundary pixels corresponding to these pixels.

At the time, although the designated boundary pixels may all be pixels surrounding the edge region, in the case of a greater edge region, a moderate number of pixels that are the closest to the target pixel in the edge region may be selected.

Then, in step S1513, correction information on the designated boundary pixels is obtained. Since the boundary pixels are in the region other than the edge region, they have already been subjected to correction of a shadow or the like by steps S1503 to S1507. Thus, the pixel values obtained by subsequent correction are obtained here.

Thereafter, in step S1515, equations for correcting the pixels in the edge region are produced. More specifically, equations are produced based on the fact that a ratio of brightness difference (P' r+s (xi)–P' r (xi)) after modification, providing for the same exposure amount for "non-illumination pickup" and "pickup with illumination" images, to brightness P' r+s (xi) of "pickup with illumination" image after modification, remains unchanged under a given shadow projecting condition. Namely, if the positions of the identified boundary pixels are xj and xk and the total number of the boundary pixels is n, the following relation is established.

$$\frac{P'r + s(xi)}{P'r + s(xi) - P'r(xi)} = \frac{\frac{1}{N}\sum_{j=0}^{N-1} P'r + s(xj)}{\frac{1}{N}\sum_{k=0}^{N-1} (P'r + s(xk) - P'r(xk))}$$

If the above equation is modified to provide an equation of reflectance R (xi), the following equation is obtained.

$$R(xi) = \frac{P'r + s(xi) \div \left(\frac{1}{N}\sum_{j=0}^{N-1} P'r + s(xj)\right) \times \left(\frac{1}{N}\sum_{k=0}^{N-1} P'r + s(xk) - P'r(xk)\right)}{\alpha \times Ls(xi)}$$

It is noted that, for attenuation ratio a, the same value is used as for the region other than the edge region. Ls (xi) is a constant independent of a position with a given light distribution of illumination lamp 220, so that the same value as that of the region other than the edge region is used.

Thus, a correcting equation for target pixel P' r+s (xi) after correction is produced. Then, in a step S1517, in accordance with the produced correcting equation, the pixels in the edge region are corrected by calculation.

Until the correction operation for the entire edge region is completed, the processes of steps S1509 to S1517 are repeated.

As described above, with hand-held scanner 200 of the present embodiment, the region other than the edge region that has been less affected by displacement is corrected. Then, the edge region is corrected based on the correction result. Accordingly, even if displacement is caused by shaking between "non-illumination pickup" and "pickup with illumination" images, such effect of shadow or the like can be properly eliminated.

Note that, in the flow chart of a FIG. 20, for correction of the region other than the edge region, processes of steps S1503 to S1507 are performed that are the same as in FIG. 9 (steps S401 to S405). These processes may be changed to those of steps S601 to S405 of FIG. 11 or steps S801 to S405 of FIG. 13.

In the embodiment herein disclosed, as described in conjunction with step S401 of FIG. 9, the brightness of one of "non-illumination pickup" and "pickup with illumination" images is adjusted with respect to the other. However, to provide the same brightness difference for images, for example, both images may be adjusted, e.g., the brightnesses of both images are changed back to those before AE adjustment.

In the embodiment herein disclosed, as described with reference to a flow chart of FIGS. 8 and 18, although non-illumination pickup is performed before pressing the start key, it may be performed after the start key is pressed. Thus, the frequency of non-pickup image is reduced to 1.

Here, the examples of eliminating the effect of a shadow due to shielding have been illustrated in conjunction with correction of a shadow or the like. The present invention is not limited to this and can provide for correction in the same manner also for an illumination distribution of a general outside light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a first receiving portion receiving a first image of an object taken under a prescribed illuminating condition;
   a second receiving portion receiving a second image of said object taken under an illuminating condition different from said prescribed illuminating condition; and
   an eliminating portion eliminating an effect caused by an outside light using said received first and second images, said eliminating portion including
   an adjusting portion adjusting at least one of said first and second images to equalize brightness differences of said first and second images, and
   a calculating portion calculating a difference between said first and second images adjusted by said adjusting portion to have the same brightness difference.

2. The image processing apparatus according to claim 1, wherein the brightness difference adjusted by said adjusting portion is caused by a difference between exposure amounts respectively for said first and second receiving portions when said first and second images are taken.

3. The image processing apparatus according to claim 1, further comprising:
   a first exposure amount receiving portion receiving an exposure amount when said first image is taken; and
   a second exposure amount receiving portion receiving an exposure amount when said second image is taken,
   said adjusting portion adjusting said first and second images to have the same brightness difference based on said exposure amounts respectively received by said first and second exposure amount receiving portions.

4. The image processing apparatus according to claim 1, further comprising:
   a first brightness difference receiving portion receiving a brightness difference between a maximum brightness portion having a highest brightness and a minimum brightness portion having a lowest brightness of said first image; and
   a second brightness difference receiving portion receiving a brightness difference between a maximum brightness portion having a maximum brightness and a minimum brightness portion having a minimum brightness of said second image,
   said adjusting portion adjusting said images to have the same brightness difference based on said brightness differences respectively received by said first and second brightness difference receiving portions.

5. The image processing apparatus according to claim 4, wherein said maximum brightness portion having the maximum brightness and said minimum brightness portion having the minimum brightness of each of said first and second data are in an image region other than a region of said object of said first and second images.

6. The image processing apparatus according to claim 4, wherein said maximum brightness portion having the maximum brightness and said minimum brightness portion having the minimum brightness of each of said first and second data are in an image region of said object of said first and second images.

7. The image processing apparatus according to claim 1, further comprising:
   an extracting portion extracting an edge region from at least one of said first and second images; and
   a controlling portion controlling to eliminate an effect of outside light by said eliminating portion for a region other than said extracted edge region, and eliminate the effect of outside light based on the elimination result of the outside light for the region other than said edge region for said extracted edge region.

8. The image processing apparatus according to claim 7, wherein said controlling portion includes a identifying portion identifying a proximity pixel of a region other than the edge region that corresponds to a target pixel in said extracted edge region, and eliminates elimination of the effect of the outside light of said target pixel based on a pixel value of said identified proximity pixel from which the effect of outside light has been eliminated.

9. The image processing apparatus according to claim 7, wherein said extracting portion extracts said edge region with margin corresponding to a maximum probable width caused by shaking from one of said first and second images.

10. The image processing apparatus according to claim 7, wherein said extracting portion extracts a region determined as an edge region from at least one of said first and second images.

11. An image pickup apparatus, comprising:
    an illuminating portion for illuminating an object with light;
    a pickup portion for taking an image of said object; and
    the image processing apparatus according to claim 1, wherein said first and second images are taken by said image pickup portion under different illuminating conditions of said illuminating portion.

12. The image pickup apparatus according to claim 11, wherein said image processing apparatus further comprises:
    an extracting portion extracting an edge region from at least one of said first and second images; and
    a controlling portion controlling to eliminate an effect of outside light by said eliminating portion for a region other than said extracted edge region, and eliminate the effect of outside light based on the elimination result of the outside light for the region other than said edge region for said extracted edge region.

13. An image processing method comprising the steps of:
    illuminating an object under a first illuminating condition and receiving a first image of thus illuminated object under a first receiving condition;
    illuminating the object under a second illuminating condition and receiving a second image of thus illuminated object under a second receiving condition, the second illuminating condition and the second receiving condition being respectively different from the first ones;
    modifying the first image data and/or the second image data so that a difference between an effect caused by the first receiving condition on the first image and an effect caused by the second receiving condition on the second image is eliminated; and
    detecting a difference between the first and second images modified by said modifying step.

14. The image processing method according to claim 13, wherein one of the first and second illuminating conditions refers to a condition of more intensively applying light than the other, and a factor common to both of the first illuminating condition and the second illuminating condition is eliminated based on the detected difference.

15. The image processing method according to claim 13, further comprising the steps of:
    extracting an edge area from at least one of the first image and second image; and
    modifying the extracted edge area based on the detected difference.

16. The image processing method according to claim 13, wherein the receiving condition is a product of a shutter releasing time and an aperture opening area.

* * * * *